(12) United States Patent
Smith et al.

(10) Patent No.: US 10,556,631 B2
(45) Date of Patent: Feb. 11, 2020

(54) LOW PROFILE ROLLER ASSEMBLY

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

(*) Notice: Subject to any disclaimer, the term of this patent is extended or adjusted under 35 U.S.C. 154(b) by 47 days.

(21) Appl. No.: 15/666,149

(22) Filed: Aug. 1, 2017

(65) Prior Publication Data

US 2017/0327166 A1 Nov. 16, 2017

Related U.S. Application Data

(63) Continuation-in-part of application No. 15/285,366, filed on Oct. 4, 2016, now Pat. No. 9,862,437, which
(Continued)

(51) Int. Cl.
*B62D 57/032* (2006.01)
*E21B 15/00* (2006.01)
*B62D 57/02* (2006.01)

(52) U.S. Cl.
CPC ........... *B62D 57/032* (2013.01); *B62D 57/02* (2013.01); *E21B 15/003* (2013.01); *E21B 15/006* (2013.01)

(58) Field of Classification Search
CPC ..... B62D 57/032; B62D 57/02; E21B 15/003; E21B 15/006
See application file for complete search history.

(56) References Cited

U.S. PATENT DOCUMENTS 1,001,299 A 8/1911 Page
1,242,635 A 10/1917 Anderson
(Continued)

FOREIGN PATENT DOCUMENTS

CA 2871406 11/2014
CA 2798743 8/2015
(Continued)

OTHER PUBLICATIONS

Schwabe Williamson & Wyatt, PC "Listing of Related Cases", Sep. 5, 2017, 1 page.
(Continued)

*Primary Examiner* — Joseph M Rocca
*Assistant Examiner* — Michael R Stabley
(74) *Attorney, Agent, or Firm* — Schwabe Williamson & Wyatt

(57) ABSTRACT

A low-profile roller assembly reduces an overall mounting height of walking machines enabling use in a wider variety of structures and locations while also reducing complexity and over cost. The low-profile roller assembly may include a roller device with a substantially flat roller cage with one or more slots configured to hold a single layer of rollers. The roller device may move longitudinally relative to a support foot and a load plate may move longitudinally relative to both the support foot and the roller device. The load plate may laterally displace relative to a longitudinal axis of the support foot or may laterally displace relative to longitudinal axes of both the support foot and the roller device.

25 Claims, 26 Drawing Sheets

Related U.S. Application Data is a continuation of application No. 14/529,566, filed on Oct. 31, 2014, now Pat. No. 9,533,723, which is a continuation-in-part of application No. 13/909,969, filed on Jun. 4, 2013, now Pat. No. 9,096,282, and a continuation-in-part of application No. 13/711,269, filed on Dec. 11, 2012, now Pat. No. 8,561,733, and a continuation-in-part of application No. 13/711,193, filed on Dec. 11, 2012, now Pat. No. 8,573,334, said application No. 13/909,969 is a continuation-in-part of application No. 13/711,315, filed on Dec. 11, 2012, now Pat. No. 8,490,724.

(60) Provisional application No. 62/450,876, filed on Jan. 26, 2017, provisional application No. 61/757,517, filed on Jan. 28, 2013, provisional application No. 61/576,657, filed on Dec. 16, 2011.

(56) References Cited

U.S. PATENT DOCUMENTS

| | | |
|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,644,691 A * | 7/1953 | Pohle .................. B62B 5/0083 280/28.5 |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |

(56) References Cited

U.S. PATENT DOCUMENTS

| | | |
|---|---|---|
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |
| 9,096,282 B2 | 8/2015 | Smith et al. |
| 9,463,833 B2 | 10/2016 | Smith et al. |
| 9,533,723 B2 | 1/2017 | Smith et al. |
| 9,751,578 B2 | 9/2017 | Smith |
| 9,862,437 B2 | 1/2018 | Smith et al. |
| RE46,723 E | 2/2018 | Smith et al. |
| 2002/0185319 A1 | 12/2002 | Smith |
| 2004/0211598 A1 | 10/2004 | Palidis |
| 2004/0240973 A1 | 12/2004 | Andrews |
| 2006/0027373 A1 | 2/2006 | Carriere |
| 2006/0213653 A1 | 9/2006 | Cunningham |
| 2009/0000218 A1 | 1/2009 | Lee |
| 2009/0188677 A1 | 7/2009 | Ditta |
| 2009/0200856 A1 | 8/2009 | Chehade |
| 2009/0283324 A1 | 11/2009 | Konduc |
| 2010/0252395 A1 | 10/2010 | Lehtonen |
| 2011/0072737 A1 | 3/2011 | Wasterval |
| 2011/0114386 A1 | 5/2011 | Souchek |
| 2012/0219242 A1 | 8/2012 | Stoik |
| 2013/0153309 A1 | 6/2013 | Smith et al. |
| 2013/0156538 A1 | 6/2013 | Smith et al. |
| 2013/0156539 A1 | 6/2013 | Smith et al. |
| 2013/0277124 A1 | 10/2013 | Smith et al. |
| 2014/0014417 A1 | 1/2014 | Smith et al. |
| 2014/0054097 A1 | 2/2014 | Bryant |
| 2014/0158342 A1 | 6/2014 | Smith |
| 2014/0161581 A1 | 6/2014 | Smith et al. |
| 2015/0053426 A1 | 2/2015 | Smith et al. |
| 2015/0166134 A1 | 6/2015 | Trevithick |
| 2016/0176255 A1 | 6/2016 | Guiboche |
| 2016/0221620 A1 | 8/2016 | Smith |
| 2016/0297488 A1 | 10/2016 | Smith |
| 2017/0021880 A1 | 1/2017 | Smith |
| 2017/0022765 A1 | 1/2017 | Csergei |
| 2017/0101144 A1 | 4/2017 | Higginbotham, II |

FOREIGN PATENT DOCUMENTS

| | | |
|---|---|---|
| CA | 2798774 | 9/2015 |
| CA | 2798790 | 10/2015 |
| CH | 359422 | 1/1962 |
| CN | 1515477 | 7/2003 |
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Notice of Pending Litigation Under 37 CFR 1.56 Pursuant to Granted Request for Prioritized Examination Under 37 CFR 1.102€(1), Jun. 28, 2016.

Defendants' First Amended Answer, Affirmative Defenses, and Counterclaims to Plaintiff's Complain for Patent Infringement, Jun. 27, 2016, p. 9, section 16.

Defendants' Answer, Affirmative Defenses, and Counterclaims to Plaintiff's Complaint for Patent Infringement, Jun. 6, 2016, p. 6, Section 2.

Entro Industries, Inc. brochure "The Future of Rig Walkers", Jun. 2012; 4 pages.

Columbia Industries, LLC brochure "Kodiak Cub Rig Walking System", 2009; 4 pages.

Defendants' Second Amended Answer, Affirmative Defenses, and Counterclaims to Plaintiff's Complain for Patent Infringement, Jul. 12, 2016, p. 9, Sections 15-18.

Defendant Hydraulic System, Inc.'s Preliminary Invalidity Contentions, Nov. 18, 2016, pp. 1-6.

Defendant Hydraulic System, Inc.'s Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Airstream Inc., "Airstream's New Dura-Torque Axle" Pamphlet.

\* cited by examiner

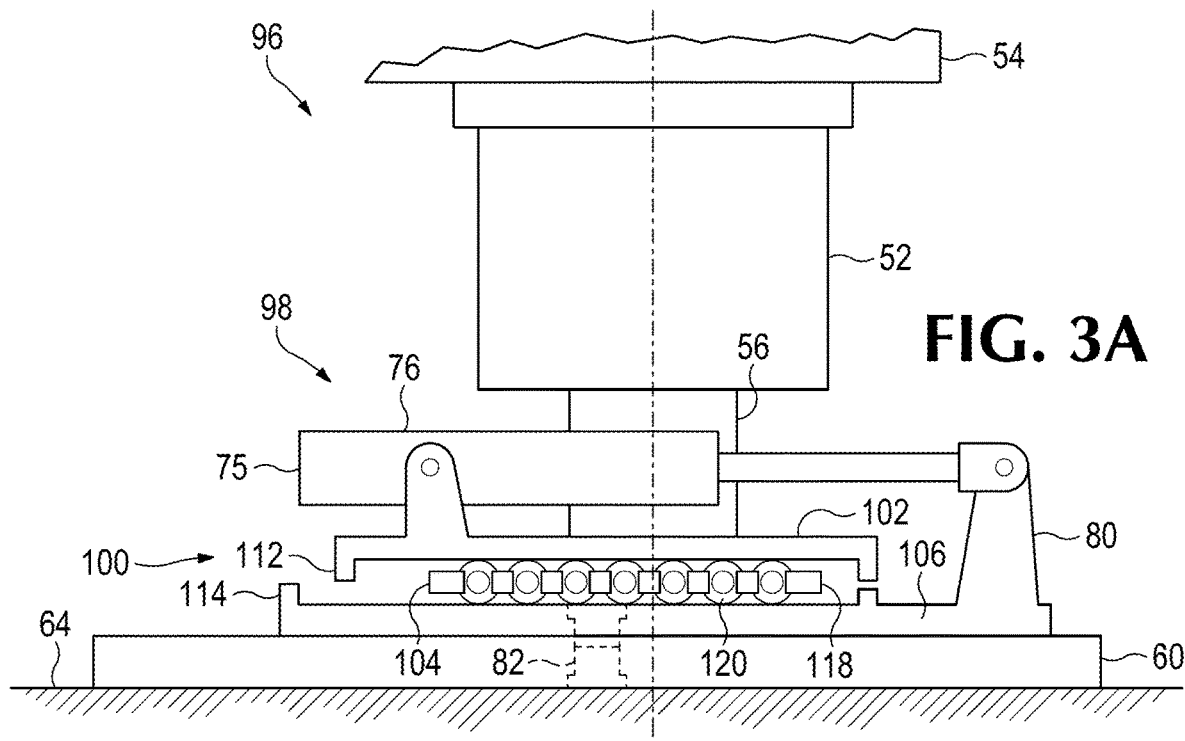
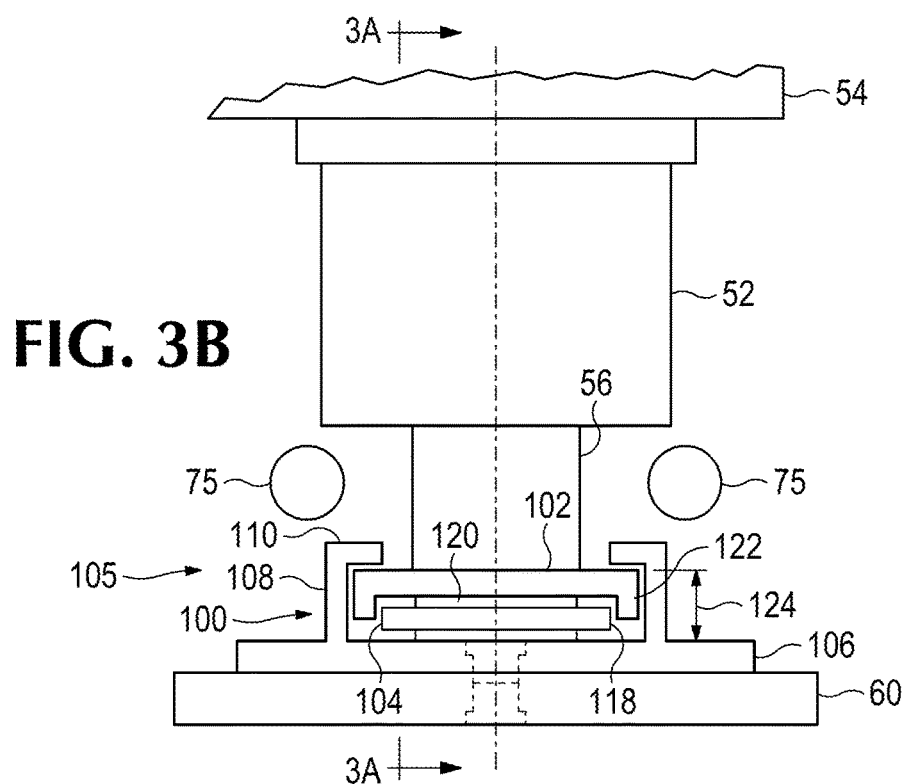

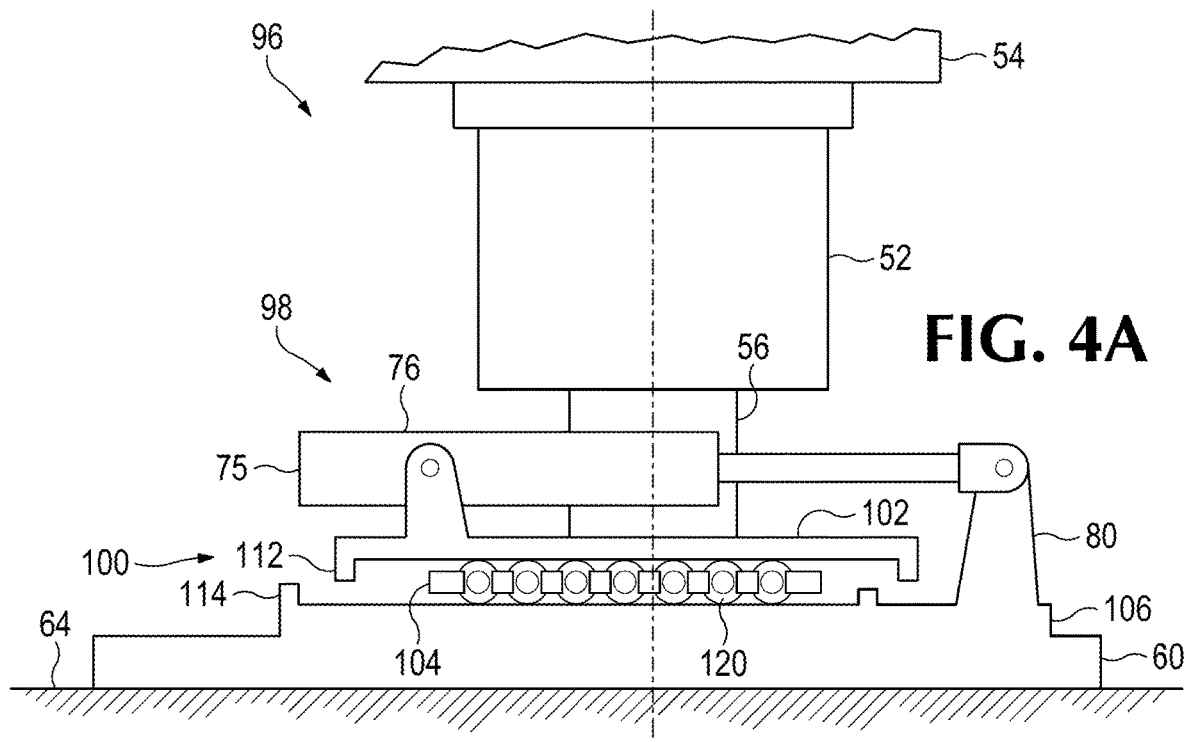
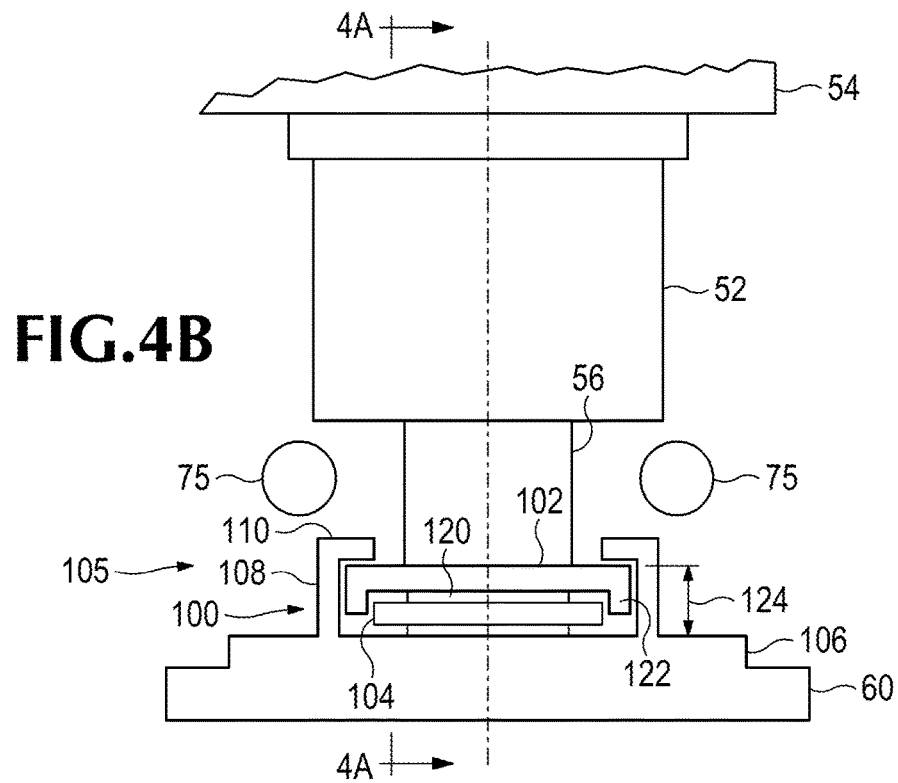

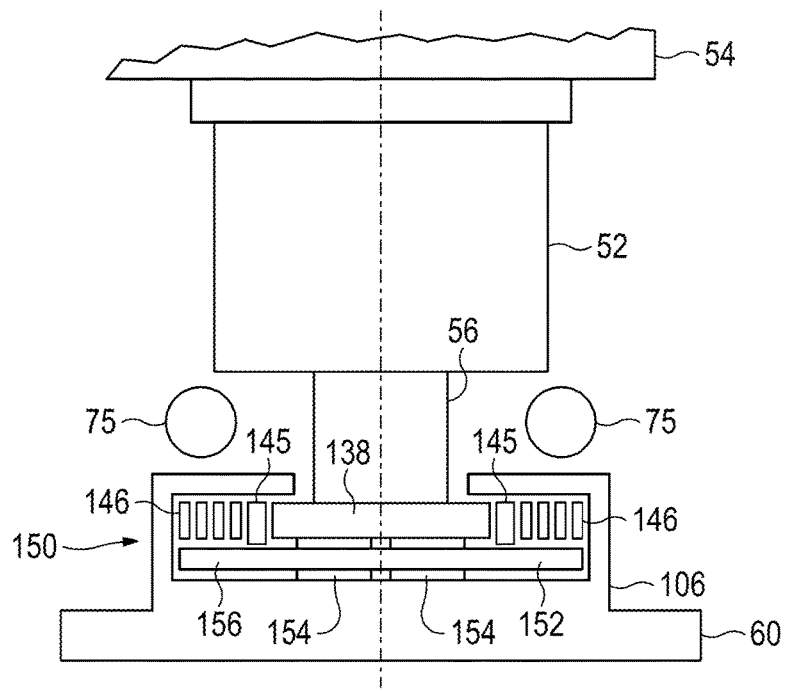
FIG. 9A
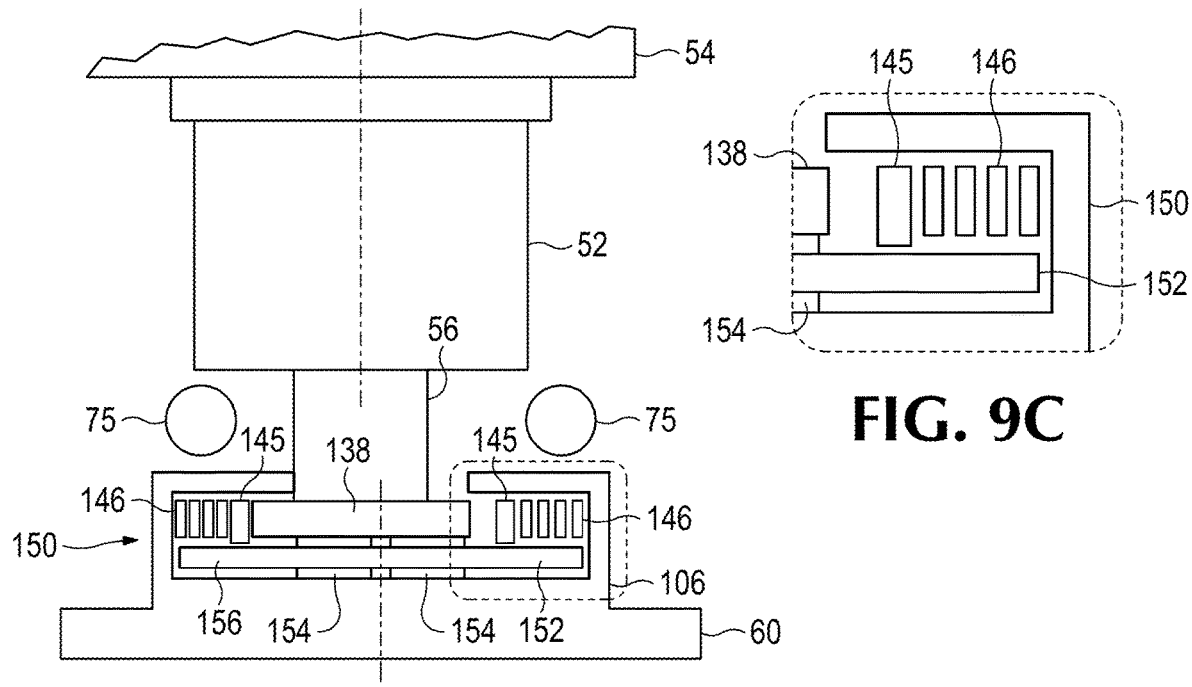
FIG. 9B
FIG. 9C

LOW PROFILE ROLLER ASSEMBLY

This application claims priority to U.S. Provisional Application 62/450,876 filed Jan. 26, 2017, entitled LOW PROFILE JACKING SYSTEM, the contents of which are hereby incorporated by reference.

This application also claims priority to and is a continuation-in-part of U.S. patent application Ser. No. 15/285,366, filed Oct. 4, 2016 which claims priority to and is a continuation of U.S. patent application Ser. No. 14/529,566, filed Oct. 31, 2014, now U.S. Pat. No. 9,533,723 issued Jan. 3, 2017. U.S. patent application Ser. No. 14/529,566 is a continuation-in-part of U.S. patent application Ser. No. 13/909,969, filed Jun. 4, 2013, now U.S. Pat. No. 9,096,282, issued Aug. 4, 2015, which claims priority to U.S. Provisional Application No. 61/757,517, filed Jan. 28, 2013. U.S. patent application Ser. No. 13/909,969 is a continuation-in-part of U.S. patent application Ser. No. 13/711,193, filed Dec. 11, 2012, now U.S. Pat. No. 8,573,334, issued Nov. 5, 2013, which claims priority to U.S. Provisional Application No. 61/576,657, filed Dec. 16, 2011. U.S. patent application Ser. No. 13/909,969 is also a continuation-in-part of U.S. patent application Ser. No. 13/711,269, filed Dec. 11, 2012, now U.S. Pat. No. 8,561,733, issued Oct. 22, 2013, which claims priority to U.S. Provisional Application No. 61/576,657, filed Dec. 16, 2011. Additionally, U.S. patent application Ser. No. 13/909,969 is a continuation-in-part of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011. The contents of all the above patents and patent applications are herein incorporated by reference in their entireties.

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

This disclosure relates generally to apparatuses for transporting a load, and more particularly to load transporting apparatuses used to move heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, these walking machines are relatively tall and therefore use relatively tall support load bearing frames to support loads. The height of the walking machines increases the overall cost of the transport system and limit which types of load bearing frames can be used for supporting the loads

BRIEF DESCRIPTION OF THE DRAWINGS

FIGS. 3A-3C show a walking machine that includes a low-profile roller assembly located on a rotatable track assembly.

FIGS. 4A-4C show a walking machine that includes a low-profile roller assembly located on a fixed track assembly.

FIGS. 9A-9C show another low-profile roller assembly with a load plate that displaces laterally relative to a roller device.

DETAILED DESCRIPTION

As described above, walkers, or walking machines, are vehicles that transport heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load.

For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism."

Walking machines may incorporate one or more walking mechanisms, depending on the specific configuration of a walking machine.

Figure 1A:
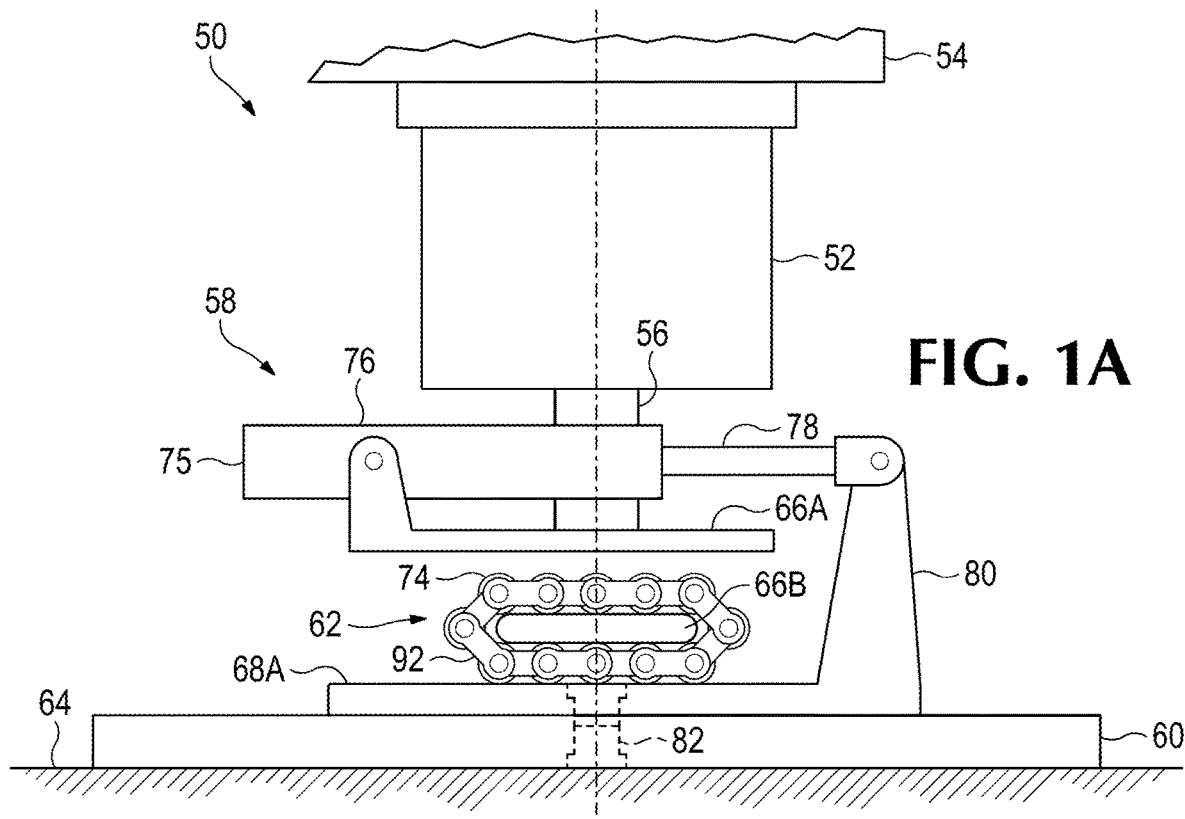
FIGS. 1A-1D show a walking machine that includes a revolving roller assembly located on a rotatable track assembly.
Figure 1B:
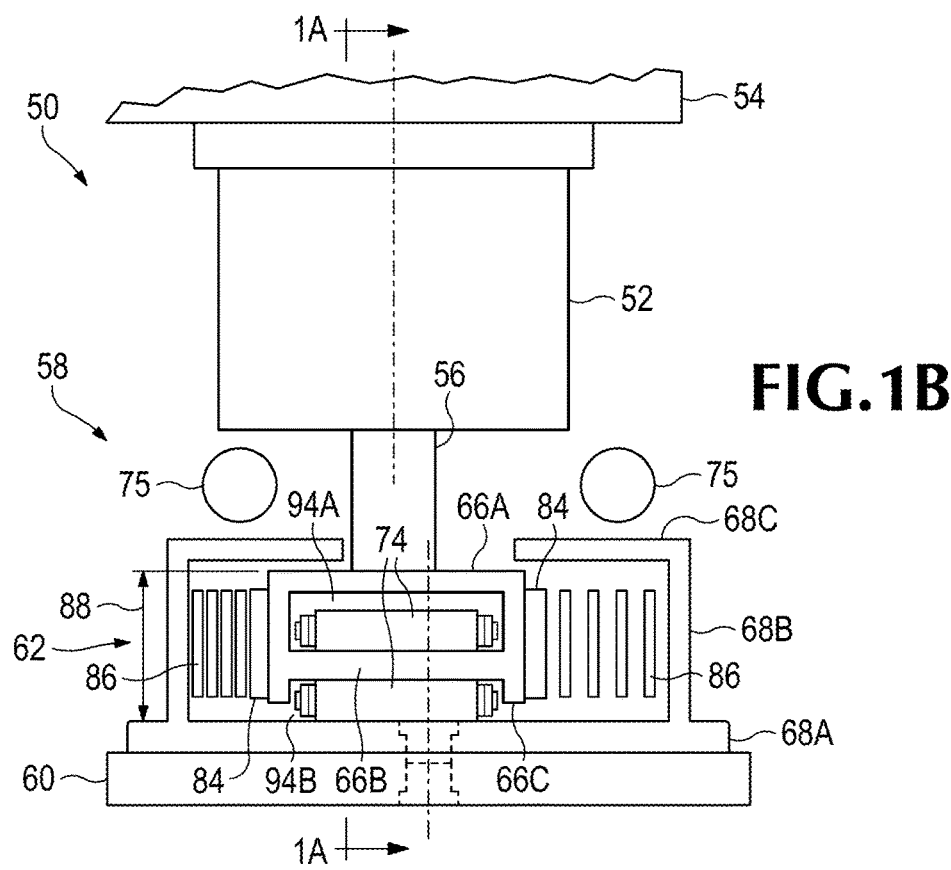
Figure 1C:
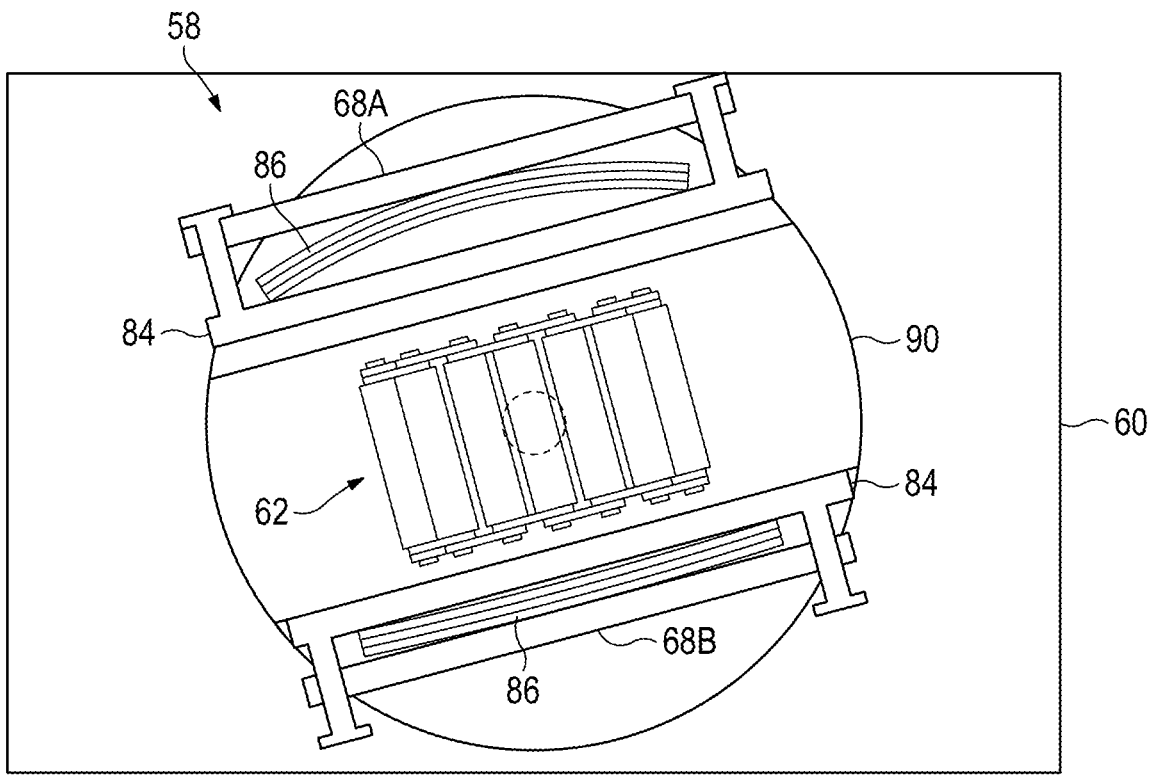
Figure 1D:
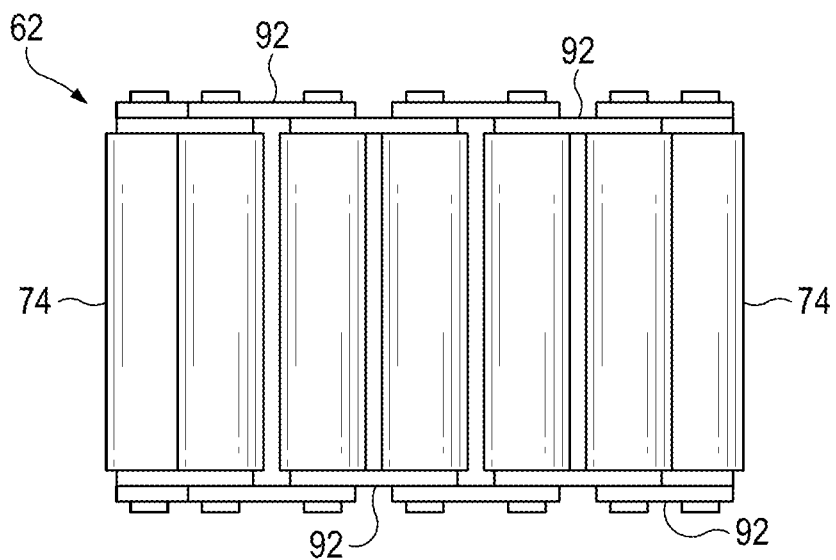

FIGS. 1A-1D show a walking machine 50 that uses a revolving roller assembly 62. FIG. 1A shows a side sectional view of revolving roller assembly 62, FIG. 1B shows a front sectional view of revolving roller assembly 62, FIG. 1C shows a top sectional view for a portion of revolving roller assembly 62, and FIG. 1D shows an isolated top view of a portion of revolving roller assembly 62. References to a single figure, such as FIG. 1, refers to all figures with a similar beginning reference number. For example, any reference to FIG. 1 refers to FIGS. 1A, 1B, 1C, and 1D.

Multiple walking machines 50 may be located on different corners, ends, or other locations underneath a load bearing frame 54. Each walking machine 50 may include a lift cylinder 52 connected to load bearing frame 54 and a lift rod 56 that moves vertically up and down inside of lift cylinder 52. A steering assembly 58 is connected between lift rod 56 and a support foot 60.

Steering assembly 58 may include a revolving roller assembly 62 that moves inside of a track assembly 68. Revolving roller assembly 62 may include a roller frame 66 that retains a set of continuously connected rollers 74. Roller frame 66 may include a top wall 66A attached to the bottom of lift rod 56, opposite side walls 66C that extend down along opposite lateral sides of rollers 74, and a load plate 66B that extends below top wall 66A between side walls 66C.

Chain links 92 may attach opposite lateral ends of rollers 74 together in a continuous revolving loop. Rollers 74 and attached chain links 92 may rotate in a circle around load plate 66B during a step operation.

Track assembly 68 may include a roller track 68A connected to the top of support foot 60, side walls 68B extending vertically up along lateral sides of roller track 68A, and upper walls 68C that extend horizontally inward toward lift rod 56 and partially over the top of roller track 68A. Guide members 84 may be located along opposite lateral sides of roller frame 66 and biasing members 86 may be located between guide members 84 and side walls 68B of track assembly 68.

Lift rod 56 may lift steering assembly 58 and support foot 60 vertically up and down. In the fully raised position, lift rod 56 may lift support foot 60 off ground surface 64. In the fully lowered position, lift rod 56 may press support foot 60 down against ground surface 64 and lift load bearing frame 54 up off of ground surface 64.

A travel mechanism 75 includes a travel cylinder 76 and travel rod 78 connected between roller frame 66, or lift rod 56, and track assembly 68 via a mounting arm 80. With load bearing frame 54 in a raised position and support foot 60 pressed against the ground surface, travel rod 78 may retract into or extend out of travel cylinder 76 and move roller assembly 62, lift rod 56, load bearing frame 54, and any load on frame 54 horizontally relative to support foot 60. During the step operation, rollers 74 and attached chain 92 revolve around middle load plate 66B.

After moving load bearing frame 54 forward, lift rod 56 may retract vertically up into lift cylinder 52 lowering load bearing frame 54 back onto ground surface 64 and lifting steering assembly 58 and support foot 60 up off of ground surface 64. While support foot 60 is raised above ground surface 64, travel rod 78 may move support foot 60 back into an extended position relative to load bearing frame 54.

Walking machine 100 may begin another step operation by again lowering support foot 60 down against ground surface 64 and raising load bearing frame 54 up off of ground surface 64. Travel rod 78 then retracts back into travel cylinder 76 moving roller assembly 62, lift rod 56, and load bearing frame 54 forward relative to support foot 60.

A rotation device 82 allows steering assembly 58 and travel mechanism 75 to rotate in a circle 90 around a vertical axis relative to support foot 60. One example rotation device 82 is described in U.S. Pat. No. 8,573,334 which has been incorporated by reference. A differential rotation between one or more steering assemblies 58 may result in a yaw differential between one or more travel mechanism 75. With a yaw differential between one or more travel mechanisms 75, a movement of the travel mechanisms 75 may result in a lateral displacement of one or more roller frames 66 relative to a longitudinal axis of one or more roller tracks 68A.

As shown in FIG. 1B, the lateral displacement created by the yaw differential of one or more travel mechanisms 75 may laterally displace roller frame 66 and rollers 74 relative to the longitudinal axis or centerline of one or more roller tracks 68A. In this example, the lateral displacement causes roller frame 66 to press against left guide member 84 and compress left biasing member 86. After completing the step operation, lift rod 56 lowers load bearing frame 54 and raises support foot 60 above ground surface 64. Left biasing member 86 then elastically releases from the biased state moving roller track 68A back into lateral alignment with roller frame 66.

Figure 2A:
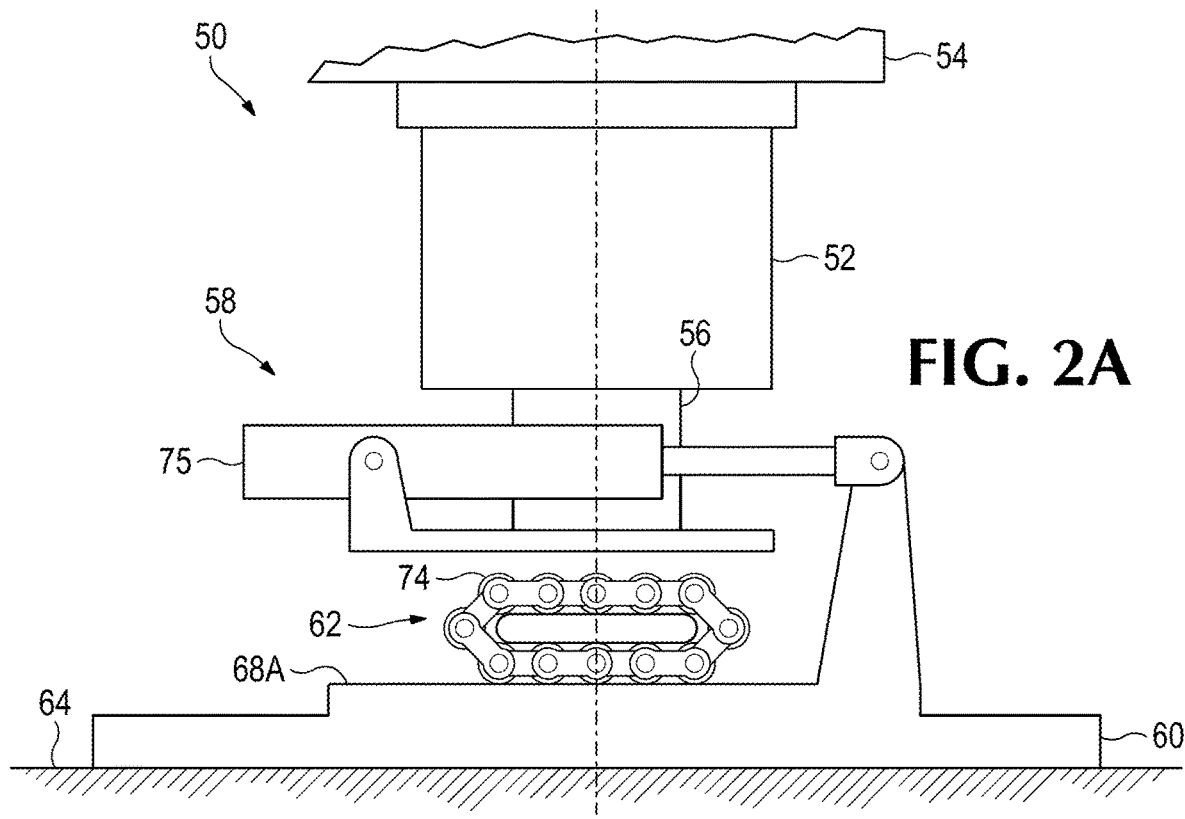
FIGS. 2A-2C show a walking machine that includes a revolving roller assembly located on a fixed track assembly.
Figure 2B:
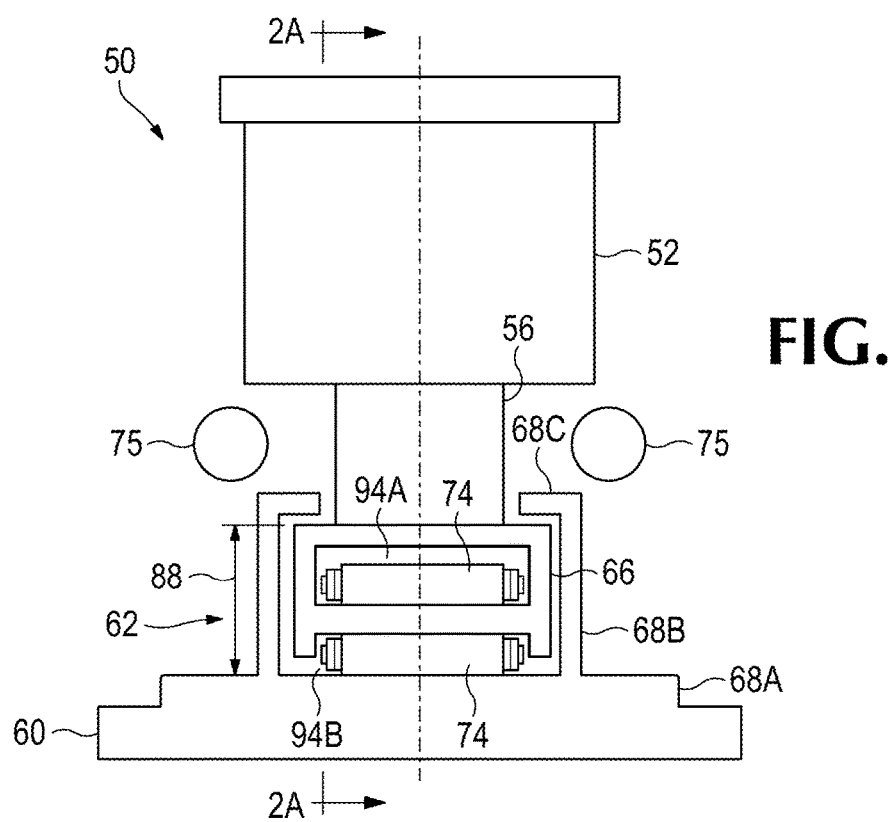
Figure 2C:
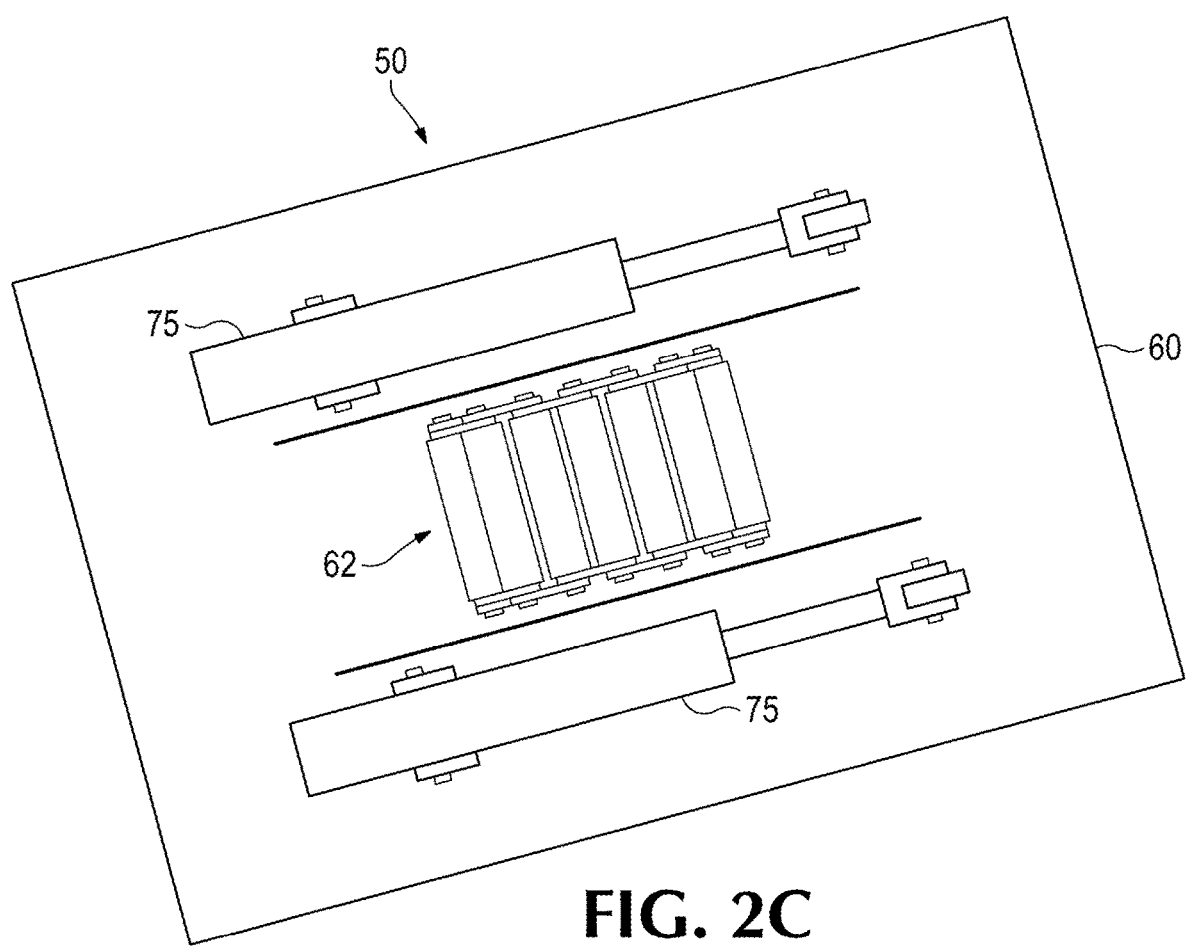

FIG. 2 shows walking machine 50 from FIG. 1 with revolving roller assembly 62 but without rotation device 82 and biasing members 86. FIG. 2A shows a side sectional view of a revolving roller assembly 62, FIG. 2B shows a front sectional view of revolving roller assembly 62, and FIG. 2C shows a top plan sectional view for a portion of revolving roller assembly 62. In this example, roller track 68A is rigidly fixed to support foot 60. To steer walking machine 50, support foot 60 and attached steering assembly 58 are rotated about lift rod 56.

Examples of walking machine 50 are described in U.S. Pat. Nos. 9,533,723; 9,096,282; 8,573,334, 8,561,733, and 8,490,724, which have been incorporated by reference in their entireties and therefore is not described in further detail.

Revolving roller assembly 62 in FIGS. 1 and 2 has a mounting height 88 dictated by the structure of roller frame 66 and rollers 74. For example, roller frame 66 includes an upper chamber 94A that retains the upper row of rollers 74 and a lower chamber 94B that retains the lower row of rollers 74.

Roller frame 66, rollers 74, and chains links 92 are also longitudinally and laterally displaced by the same amount. For example, during a step operation, travel mechanism 75 may move roller frame 66 forward relative to support foot 60 causing load plate 66B to push rollers 74 forward with a same amount of longitudinal displacement. If roller frame 66 is laterally displaced during the step operation relative to the longitudinal axis of support foot 60, roller frame 66 also laterally displaces rollers 74 and chain links 92 by a similar amount.

Figure 3C:
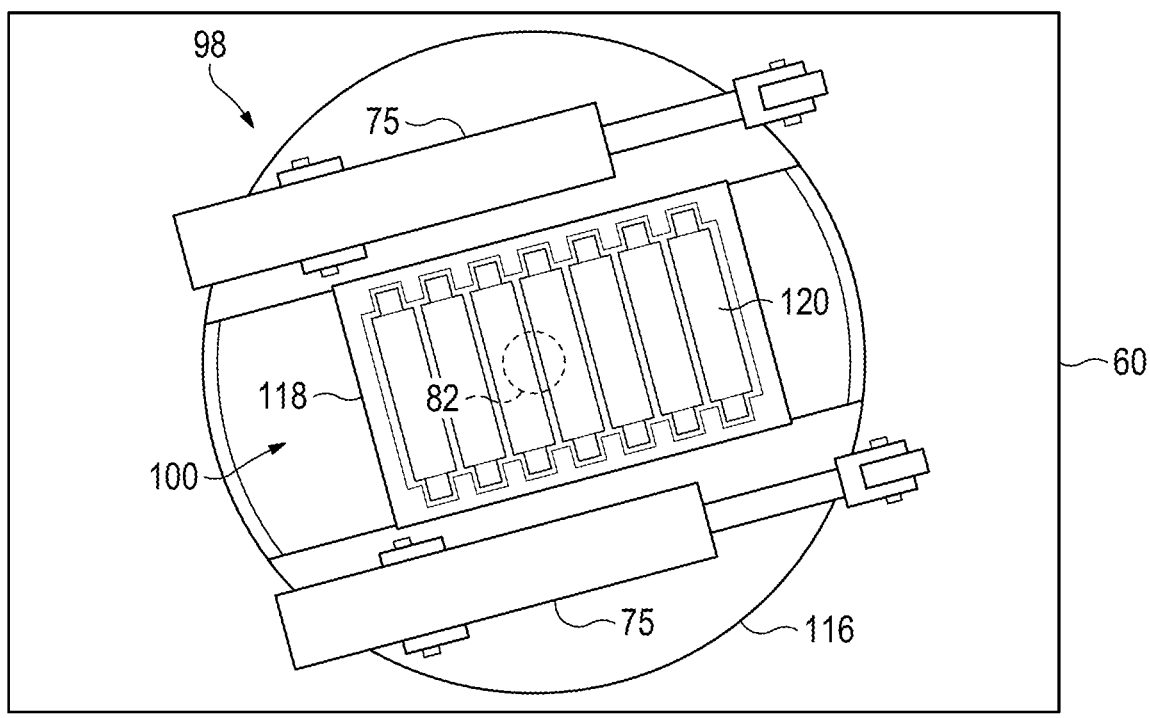

FIG. 3 shows one example reciprocating roller assembly 100 used in a walking machine 96. FIG. 3A shows a side sectional view of reciprocating roller assembly 100, FIG. 3B shows a front sectional view of reciprocating roller assembly 100, and FIG. 3C shows a top sectional view showing a portion of reciprocating roller assembly 100. In one example, walking machine 96 includes lift cylinder 52, lift rod 56, and support foot 60 similar to those described above in FIGS. 1 and 2.

A steering assembly 98 includes a track assembly 105, reciprocating roller assembly 100, and travel mechanism 75. Track assembly 105 includes a roller track 106 with vertically upward extending lateral side walls 108 and horizontal inwardly extending upper walls 110 that extend inward from the top of side walls 108. Reciprocating roller assembly 100 includes a load plate 102 attached to the bottom of lift rod 56 and a roller device 104 located between load plate 102 and roller track 106.

In one example, steering assembly 98 includes travel mechanism 75 similar to that described above in FIGS. 1 and 2. Travel mechanism 75 is coupled between load plate 102 or lift rod 56 and roller track 106 via mounting arm 80. Travel mechanism 75 is again configured to displace load bearing frame 54 relative to support foot 60.

In one example, load plate 102 is a single substantially flat linear plate that reciprocates over a top surface of roller device 104 during a step operation. Load plate arms 112 may extend down from opposite front and back longitudinal ends of load plate 102. Load plate sides 122 may extend at least partially down along opposite lateral sides of load plate 102. Vertically upwardly extending arms 114 may extend up from the front and back longitudinal ends of roller track 106.

In one example, roller device 104 may include a substantially flat roller frame or cage 118 that includes one or more slots that hold rollers 120. Instead of a revolving dual layer of rollers, roller device 104 may use one substantially flat linear layer or row of rollers 120. Roller frame 66 shown above in FIGS. 1 and 2 includes a top wall 66A, side walls 66C, and middle load plate 66B forming two chambers 94A and 94B. Reciprocating roller assembly 100 uses a single substantially flat linear load plate 102 with no upper chamber 94A. The combination of linear roller device 104 and linear load plate 102 provide a substantially shorter mounting height 124 for reciprocating roller assembly 100 compared with the mounting height 88 of roller assembly 62 shown above in FIGS. 1 and 2.

Sides 122 of load plate 102 also may extend along and possibly press against the lateral sides of roller cage 118. Weight from a load supported by load bearing frame 54 may press vertically down against rollers 120 without applying substantial weight to roller cage 118. This allows load plate sides 122 to use a relatively small amount of force to laterally displace roller cage 118 while rollers 120 may remain in substantially a same lateral alignment relative to the longitudinal axis of support foot 60. Allowing load plate 102 to move laterally independently of rollers 120 may result in less destructive forces being asserted against roller device 104.

A rotation device 82 similar to that described above in FIG. 1 allow steering assembly 98 to rotate about a vertical axis in any position within a circle 116 relative to support foot 60. A rotation of steering assembly 98 results in a yaw change of travel mechanism 75. In a locked condition, rotation device 82 locks steering assembly 98 to support foot 60. Rotation device 82 may be similar to those described in U.S. Pat. No. 8,573,334.

Figure 4C:
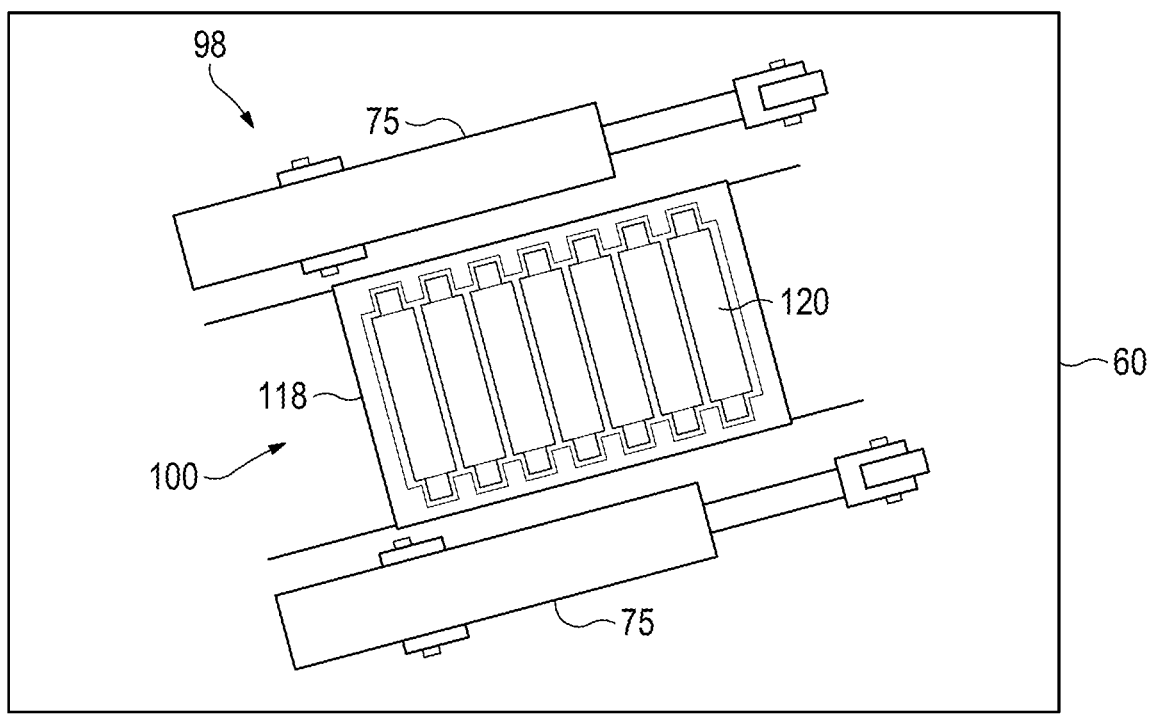

FIGS. 4A-4C show walking machine 96 without rotation device 82 of FIG. 3. In this example, roller track 106 may be rigidly attached, or formed into, support foot 60. In this example, support foot 60 is rotated about lift rod 56 to change the orientation of travel mechanism 75.

Figure 5A:
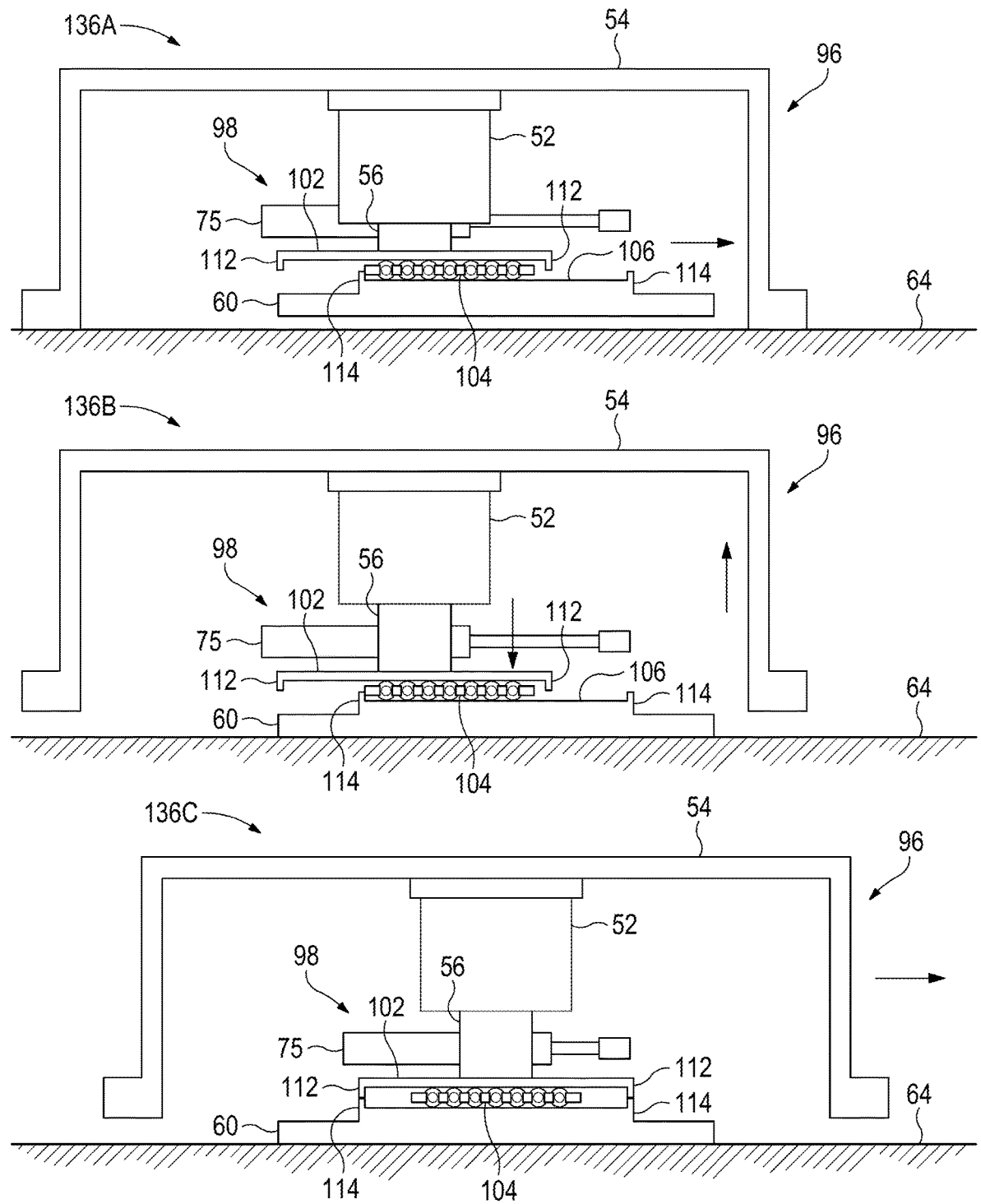
FIGS. 5A and 5B show a step operation for the walking machines of FIGS. 3 and 4.
Figure 5B:
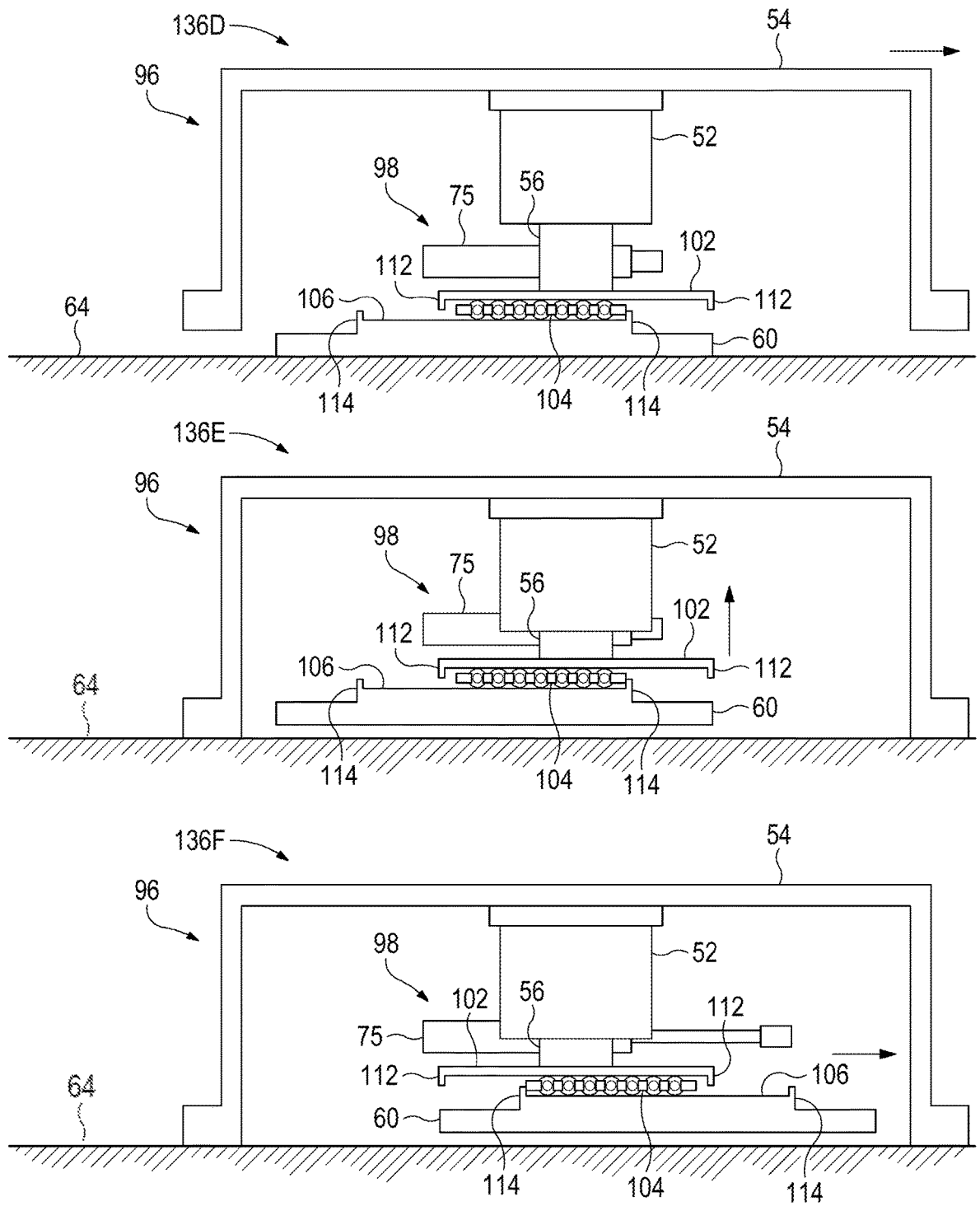

FIGS. 5A and 5B describe a step operation using reciprocating roller assembly 100 described above in FIGS. 3 and 4. During a state 136A of the step operation, lift rod 56 lowers load bearing frame 54 onto ground surface 64 and raises support foot 60 off of ground surface 64. If walking machine 96 includes rotation device 82 in FIG. 3, steering assembly 98 may rotate to a desired yaw position while support foot 60 maintains a same alignment relative to load bearing frame 54. Rotation device 82 then locks roller track 106 to support foot 60. If walking machine 96 does not include rotation device 82, steering assembly 98 and attached support foot 60 are rotated together into a desired yaw position about lift rod 56.

While still in the raised position, travel mechanism 75 may move support foot 60 and roller track 106 into an extended forward position relative to load bearing frame 54. Forward load plate arm 112 may push roller device 104 toward a back end of roller track 106 and against back roller track arm 114.

During a state 136B of the step operation, lift rod 56 lowers support foot 60 against ground surface 64 lifting load bearing frame 54 and any associated load off ground surface 64. At this point, weight from the load on load bearing frame 54 passes through lift rod 56 and load plate 102 onto a top surface of roller device 104. Roller device 104 passes the weight onto roller track 106 and support foot 60.

During a half-way state 136C of the step operation, travel mechanism 75 partially retracts moving load bearing frame 54 in a forward direction to the right relative to support foot 60. Moving loading bearing frame 54 forward rolls load plate 102 centrally over roller device 104 and, at the same time, rolls roller device 104 centrally over roller track 106. At this intermediate state, load plate arms 112 are vertically aligned with roller track arms 114.

Referring now to FIG. 5B and state 136D of the step operation, travel mechanism 75 is fully retracted moving load bearing frame 54 into a full forward position to the right relative to support foot 60. Moving loading bearing frame 54 into this forward position rolls the back end of load plate 102 over the top of roller device 104 and at the same time rolls roller device 104 over the front end of roller track 106. In this forward position, a front longitudinal end of load plate 102 and front load plate arm 112 extend horizontally out in front of roller device 104 and roller track 106.

During the step operation, travel mechanism 75 moves load plate 102 longitudinally forward relative to support foot 60 and roller device 104, and moves roller device 104 longitudinally forward relative to support foot 60. In other words, load plate moves from a position extending in back of roller device 104 and roller track 106 to a position extending out in front of roller device 104 and roller track 106. Roller device 104 also moves from a position in the back end of roller track 106 to a position in the front end of roller track 106.

During state 136E of the step operation, travel mechanism 75 is in a fully retracted position. Lift rod 56 lowers load bearing frame 54 onto ground surface 64 and raises support foot 60 up off ground surface 64.

During state 136F of the step operation, travel mechanism 75 moves from the retracted position in state 136E back into the fully extended position previously shown in state 136A. Travel mechanism 75 causes support foot 60 to move forward relative to load bearing frame 54, roller device 104, and load plate 102. Downwardly extending front load plate arm 112 may abut up against a front end of roller device 104 and push roller device 104 toward a back end of roller track 106 while travel mechanism 75 moves from the retracted position back to the extended position.

FIG. 6 shows walking machine 96 with another example low profile roller assembly 130. FIG. 6A shows a side sectional view of roller assembly 130, FIG. 6B shows a front sectional view of roller assembly 130, FIG. 6C shows a front sectional view of roller assembly 130 in a laterally displaced state, FIG. 6D shows an enlarged view of a biasing member used with roller assembly 130, FIG. 6E shows a top sectional view for a portion of roller assembly 130, and FIG. 6F shows a top sectional view of roller assembly 130 in the laterally displaced state. In one example, walking machine 96 includes a lift cylinder 52, lift rod 56, support foot 60, and rotation device 82 similar to those described above.

Steering assembly 98 includes a track assembly 105, low profile roller assembly 130, and transport mechanism 75. Track assembly 105 includes a roller track 106 with vertically upwardly extending side walls and horizontally inwardly extending top walls generally similar to those shown above in FIGS. 3-5. Roller assembly 130 includes a roller device 132 and load plate 138. Roller device 132 includes a linear roller cage 134 that holds a linear row of rollers 120. Roller cage arms 136 extend vertically upward from longitudinal front and back ends of roller cage 134. In this example, load plate 138 is substantially flat and partially extends over roller device 132.

Figure 6A:
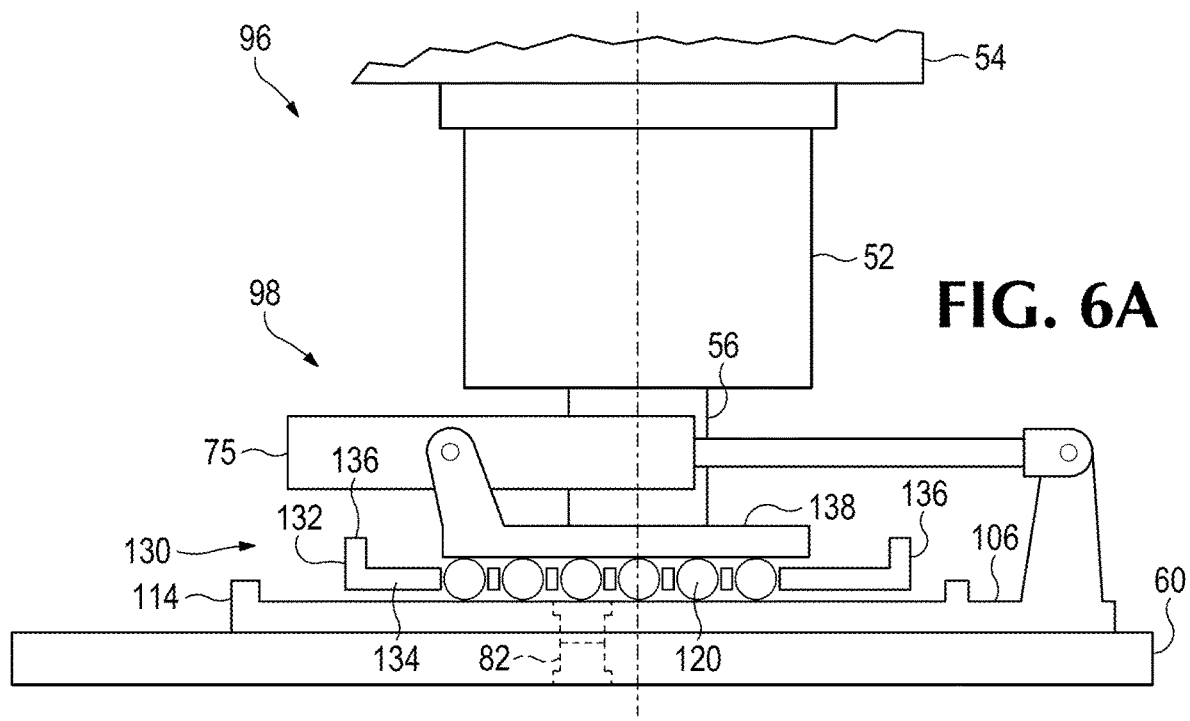
FIGS. 6A-6F show a walking machine that includes another low-profile roller assembly with a leaf spring biasing member.

FIG. 6A shows steering assembly 98 in an intermediate position. In an extended position, travel mechanism 75 may move support foot 60 fully forward relative to load bearing frame 54. The forward extension of support foot 60 may cause rear roller track arm 136 to abut up against a back end of load plate 138 and pull roller device 132 toward a back end of roller track 106.

Lift rod 56 then may lower support foot 60 lifting load bearing frame 54 up off of the ground surface. Travel mechanism 75 then retracts moving load plate 138, lift rod 56, and load bearing frame 54 forward relative to support foot 60. The forward movement causes load plate 138 to roll forward over the top of roller device 132 while at the same time causing roller device 132 to roll forward over the top of roller track 106. In other words, load plate 138 is longitudinally displaced relative to roller device 132 and roller track 106, and roller device 132 is longitudinally displaced relative to roller track 106.

Travel mechanism 75 continues to move load bearing frame 54 forward relative to support foot 60 while load plate 138 continues to roll longitudinally forward relative to roller device 132 and support foot 60. When travel mechanism 75 reaches a fully retracted state, a front end of load plate 138 may be located above the front end of roller device 132, and the front end of roller device 132 be located above the front end of roller track 106.

Support foot 60 is raised lowering load bearing frame 54 back onto the ground surface. Travel mechanism 75 moves support foot 60 back into the forward extended position relative to load bearing frame 54. Again, rear roller cage arm 136 may abut up against the rear end of load plate 138 and pull roller device 132 toward the back end of roller track 106. Steering assembly 98 then repeats another step operation.

Guide members 84 and biasing members 86A and 86B may be located between load plate 138 and roller device 132 and opposite inside walls of track assembly 105. Biasing members 86A and 86B may be any material that can elastically compress and decompress. In one example, biasing members 86 are leaf springs. As shown in more detail in FIG. 6D, guide members 84 may extend vertically along lateral sides of both load plate 138 and roller device 132.

Figure 6B:
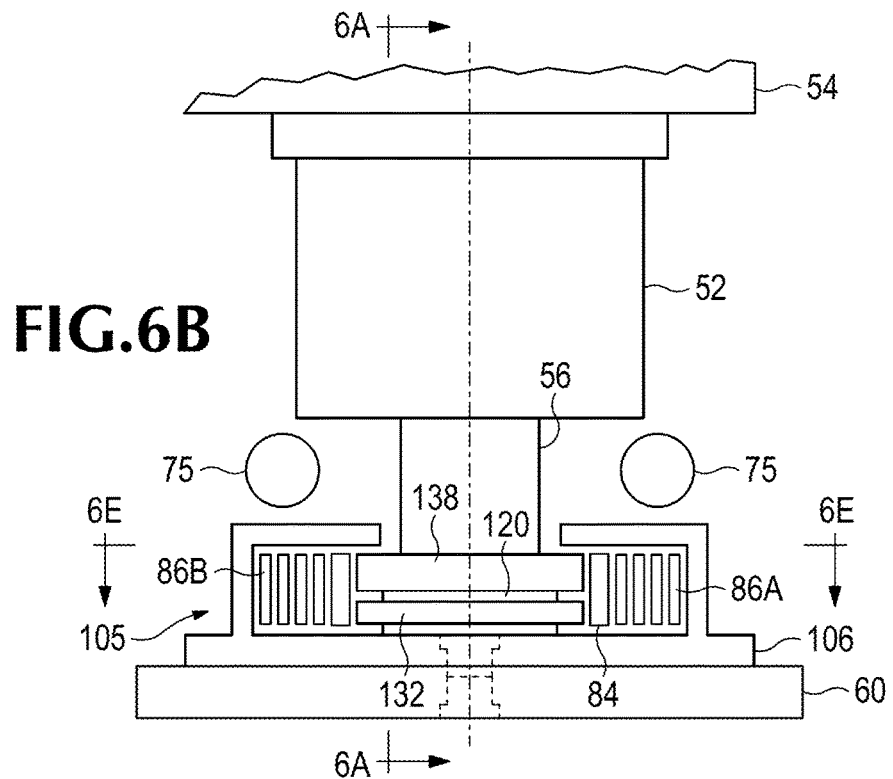

During some step operations, steering assembly 98 may move load bearing frame 54 straight forward. In these straight forward step operations, load plate 138 and roller device 132 may move straight forward substantially in line with the longitudinal axis of support foot 60 and roller track 106. Biasing members 86A and 86B may remain in a substantially decompressed state as shown in FIGS. 6B and 6E.

Guide members 84 may be spaced a slight distance from the lateral sides of load plate 138 and roller device 132. As explained above, weight on load bearing frame may transfer from load plate 138 onto rollers 120. Roller cage 134 may substantially float between load plate 138 and roller track 106. In the straight forward step operation, guides members 84 may provide enough force to keep roller cage 134 laterally aligned with the longitudinal axis of roller track 106.

As explained above, a differential rotation of one or more steering assemblies 98 may result in a yaw differential between one or more travel mechanism 75. With a yaw differential between one or more travel mechanisms 75, a movement of the travel mechanisms 75 may result in a lateral displacement of one or more roller devices 132 or load plates 138 relative to a longitudinal axis of one or more roller tracks 106.

A motion of the load in a sideways (lateral) direction relative to roller track 106 may result in load plate 138 moving in a sideways direction. Travel mechanism 75 may not restrict this motion. The lateral motion may happen while the load and load plate 138 are traveling longitudinally. Alternatively travel mechanism 75 may not create the lateral displacement, and the lateral displacement may result from the load not being able to move in a same direction or orientation (or non-linear motion) as roller track 106.

Figure 6C:
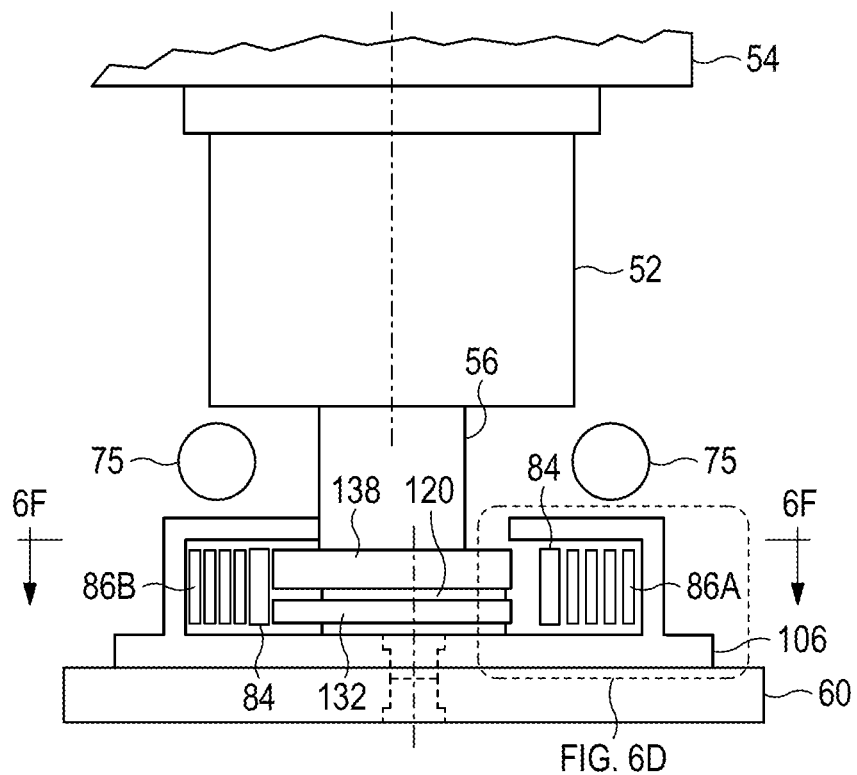
Figure 6D:
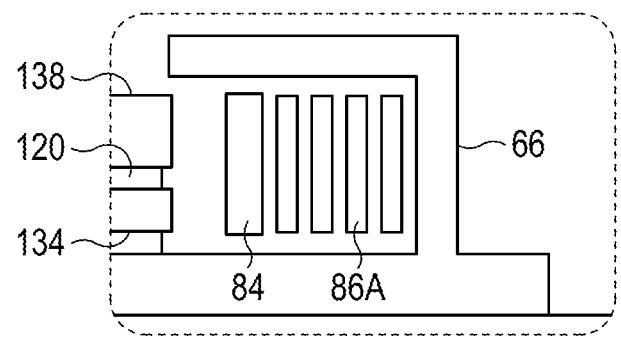
Figure 6E:
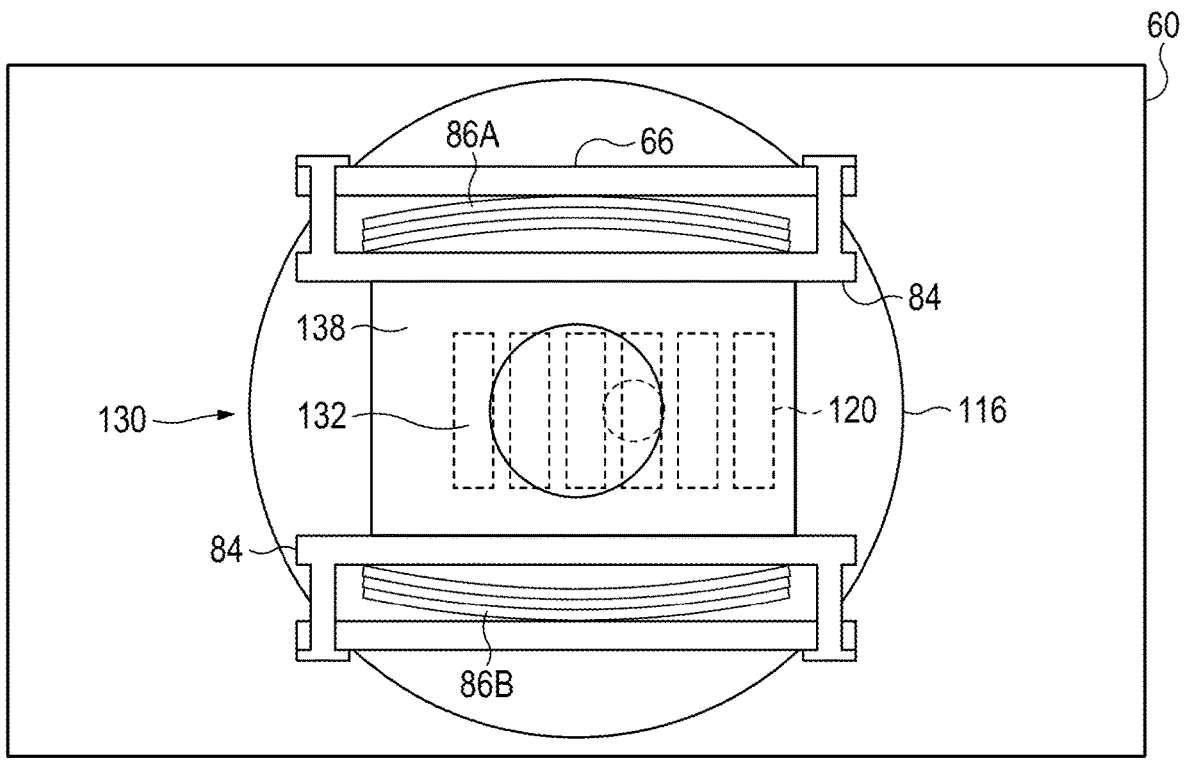
Figure 6F:
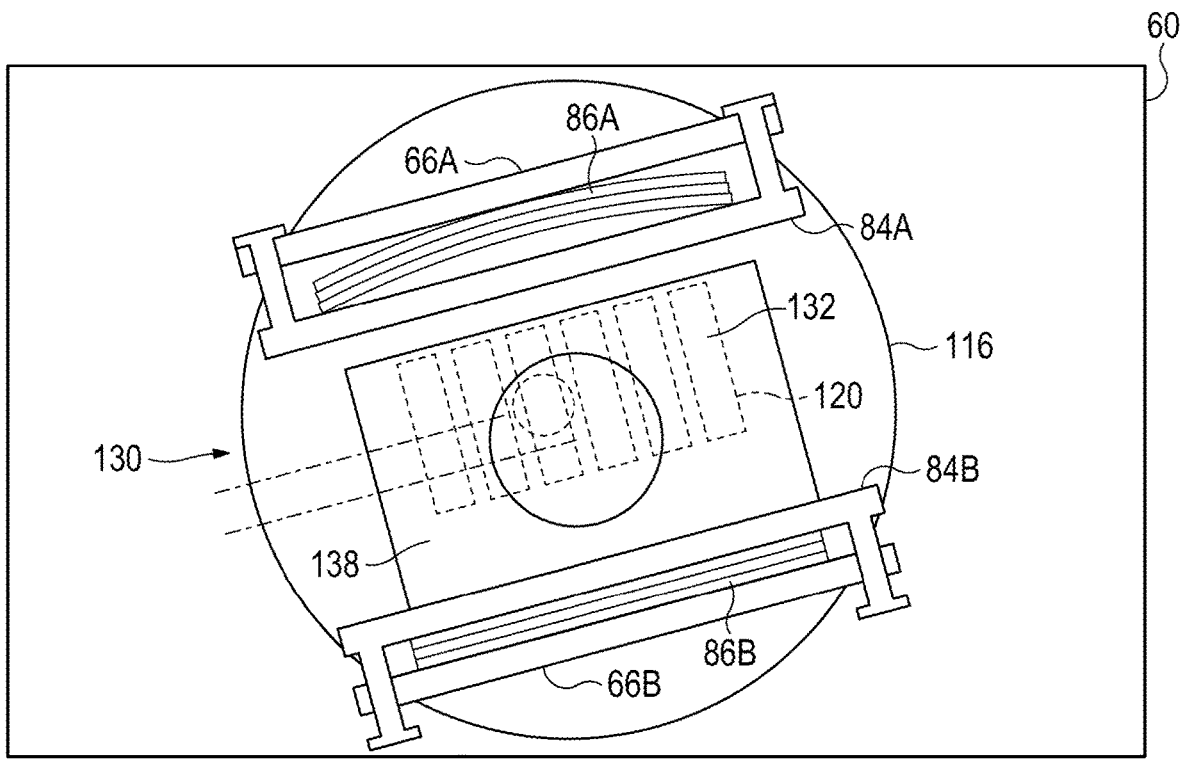

The lateral displacement of load plate 138 may compress one set of biasing members 86B as shown in FIGS. 6C and 6F. In at least one example, rollers 120 in roller device 132 may remain in a same lateral position relative to the longitudinal axis of roller track 106. However, the compressed state of biasing member 86B allows roller cage 134 to drift laterally to the left relative to the longitudinal axis of roller track 106 and abut up against left guide member 84B. Note that the lateral displacement of load plate 138 applies substantially no lateral force against the lateral sides of roller device 132.

After the step operation, load bearing frame 54 is lowered and support foot 60 raised up off of the ground surface. Biasing member 86B elastically releases from the compressed state moving roller track 106 and roller cage 134 back into alignment with the longitudinal axis of load plate 138 and rollers 120 as shown in FIGS. 6B and 6E. Thus, load plate 138 is laterally displaced relative to the longitudinal axis of roller track 106. Or in other words, load plate 138 may move laterally independently of roller device 132 or roller track 106.

A rotation device 82 may rotationally attach steering assembly 98 to support foot 60 similar to that shown above in FIG. 3. Steering assembly 98 can then rotate about a vertical axis relative to support foot 60 as represented by circle 116. In another example, track assembly 105 may be rigidly attached or formed into support foot 60 as shown above in FIG. 4. In this example, support foot 60 is rotated about lift rod 56 to change the orientation of travel mechanism 75.

FIG. 7 shows another example roller assembly 160 similar to roller assembly 130 in FIG. 6 but with a load plate 164 with opposite lateral sides 166 that extend down over lateral sides of a roller device 168. FIG. 7A shows a front sectional view of roller assembly 160 in an aligned state and FIG. 7B shows a front sectional view of roller assembly 160 in a laterally displaced state. FIG. 7C shows an expanded partial view of guide member 84 and biasing member 86 positioned next to roller assembly 160. FIG. 7D shows a top sectional view for a portion of roller assembly 160 and FIG. 6E shows a top sectional view of roller assembly 160 in the laterally displaced state.

Figure 7A:
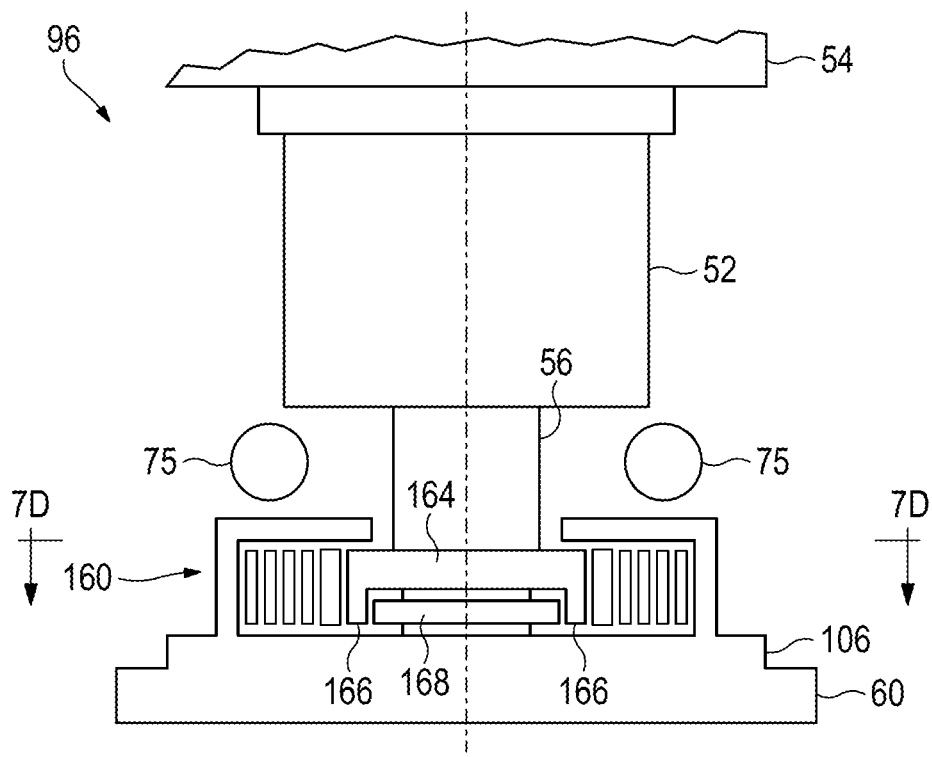
FIGS. 7A-7E show a low-profile roller assembly with a laterally displaceable load plate and roller device.
Figure 7B:
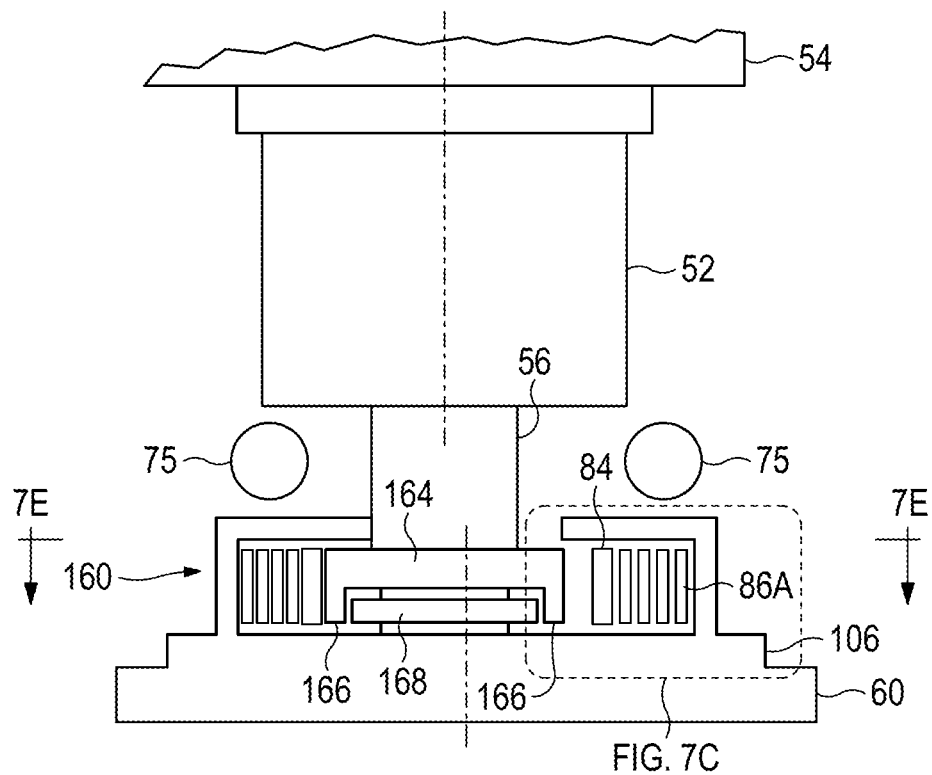
Figure 7C:
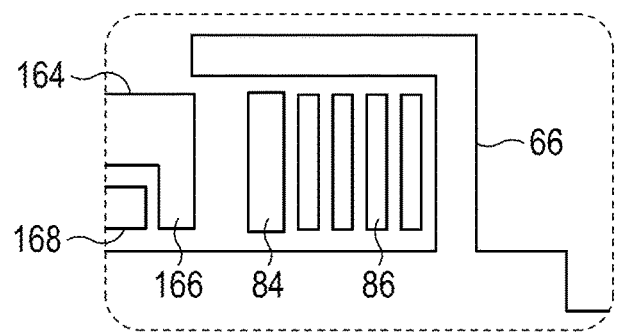
Figure 7D:
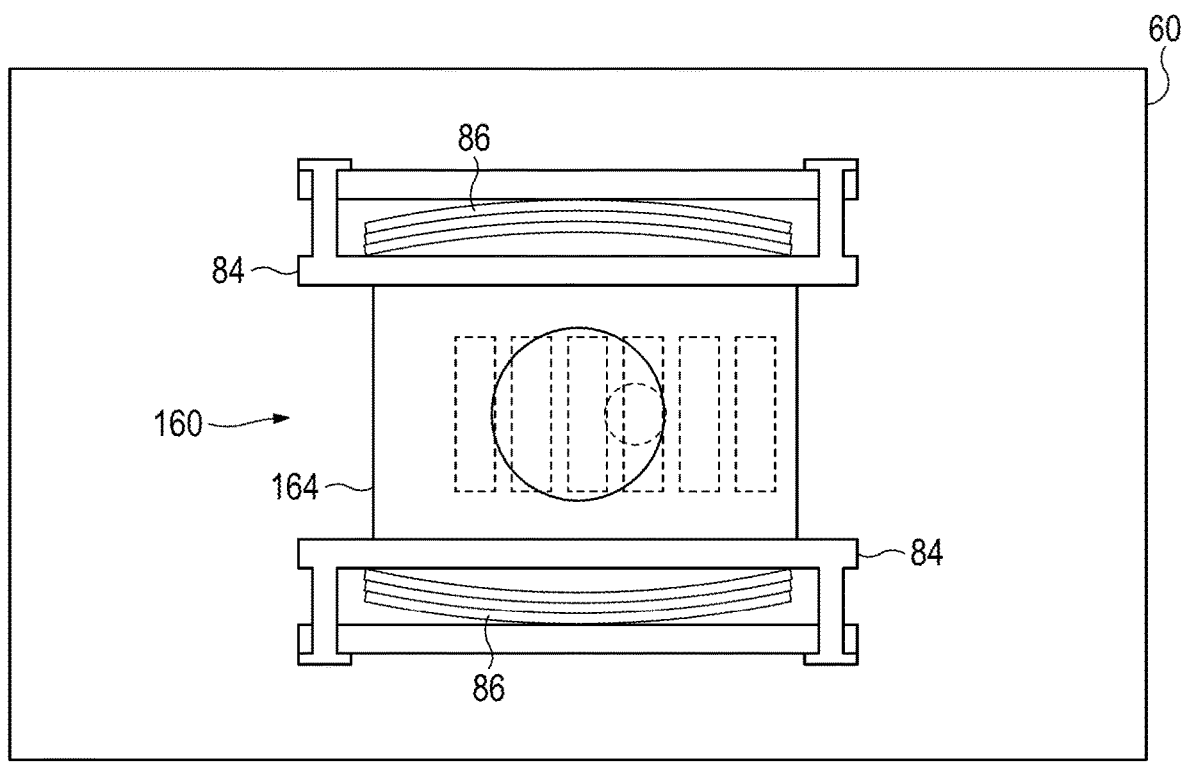
Figure 7E:
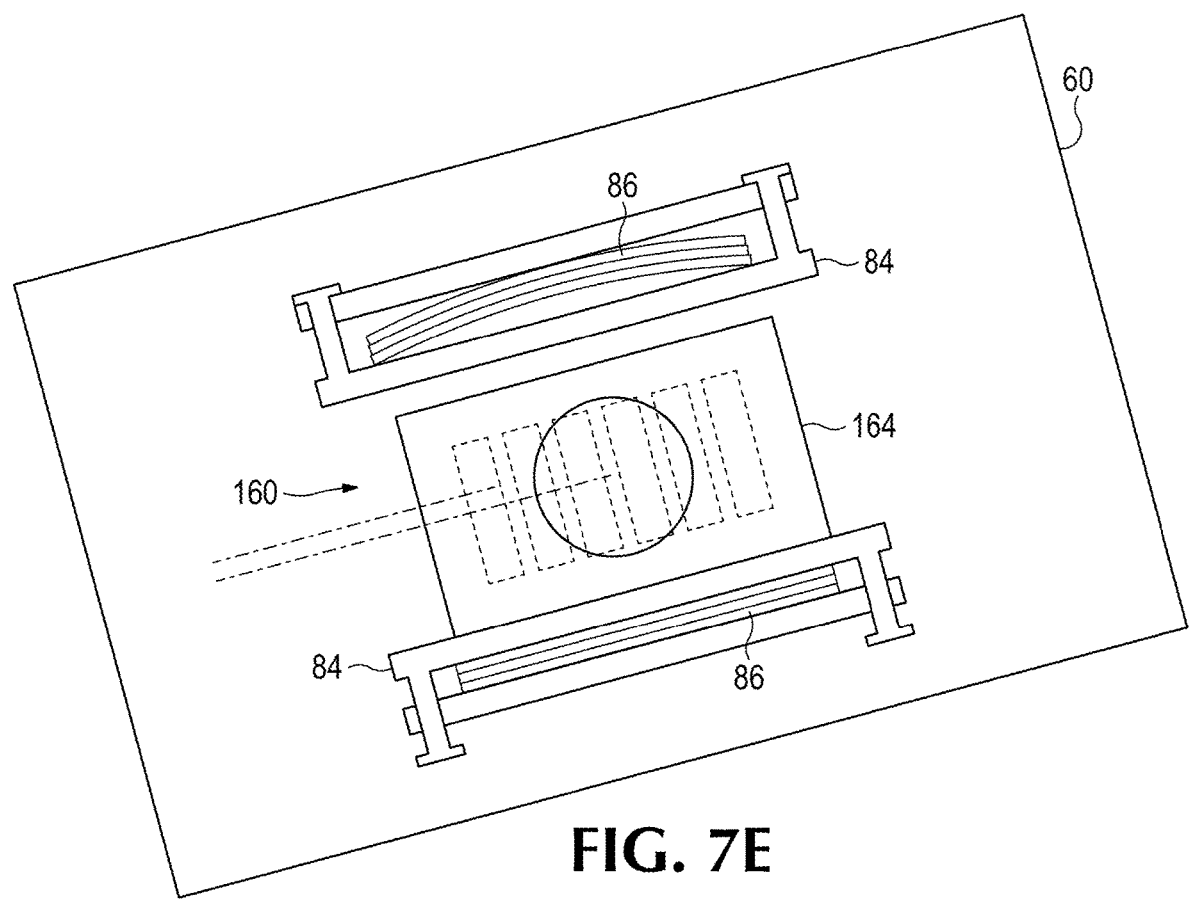

Similar to the examples above, a lateral displacement created by a yaw differential of one or more travel mechanisms 75 may laterally displace roller assembly 160 and roller device 168 relative to the longitudinal axis or centerline of one or more roller tracks 106. In this example, side arms 166 of load plate 164 also laterally displace roller device 168 relative to the longitudinal axis of support foot 60 as shown in FIGS. 7B and 7E.

FIG. 8 shows a walking machine 96 that uses a low profile roller assembly 140 with an elongated roller cage. FIG. 8A shows a side sectional view of roller assembly 140, FIG. 8B shows a front sectional view of roller assembly 140, FIG. 8C shows a front sectional view of roller assembly 140 in a laterally displaced state, FIG. 8D shows an enlarged front sectional view of a biasing member used with roller assembly 140, FIG. 8E shows a top sectional partial view of roller assembly 140, and FIG. 8F shows a top sectional partial view of roller assembly 140 in a laterally displaced state.

Walking machine 96 may be similar to other walking machines described above but may include a different roller assembly 140 and biasing members 146A and 146B. Roller assembly 140 may include a load plate 138 similar to that described above in FIG. 6. However, a roller device 142 may include a roller cage 148 that extends across substantially the entire width of roller track 106. Roller cage 148 may include one or more slots that hold rollers 144.

Guide members 145 may be located adjacent to opposite lateral sides of load plate 138. Coil spring biasing members 146A and 146B may be located between guide members 145 and opposite inside walls of track assembly 105. In this example, biasing members 146A and 146B include multiple coil springs that elastically compress and decompress. Roller cage 148 may extend underneath load plate 138, guide members 145, and biasing member 146A and 146B. Rollers 144 may only partially extend underneath load plate 138.

Figure 8A:
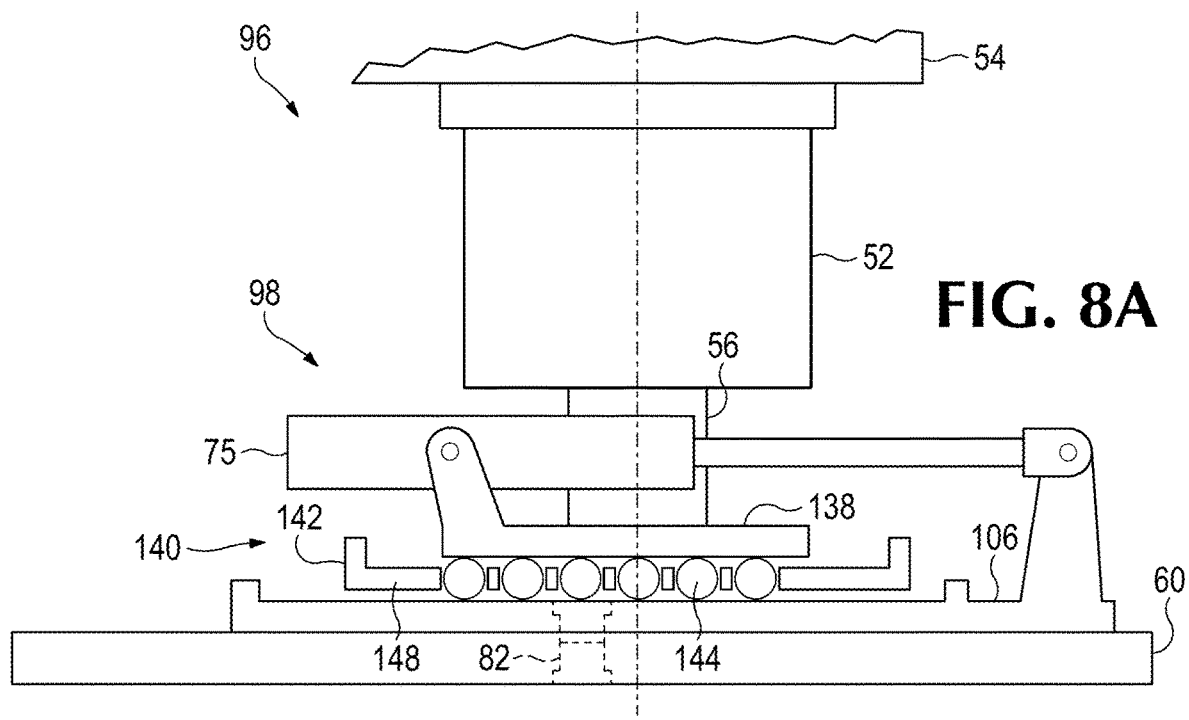
FIGS. 8A-8F show a low-profile roller assembly with a load plate that displaces laterally relative to the roller device.
Figure 8B:
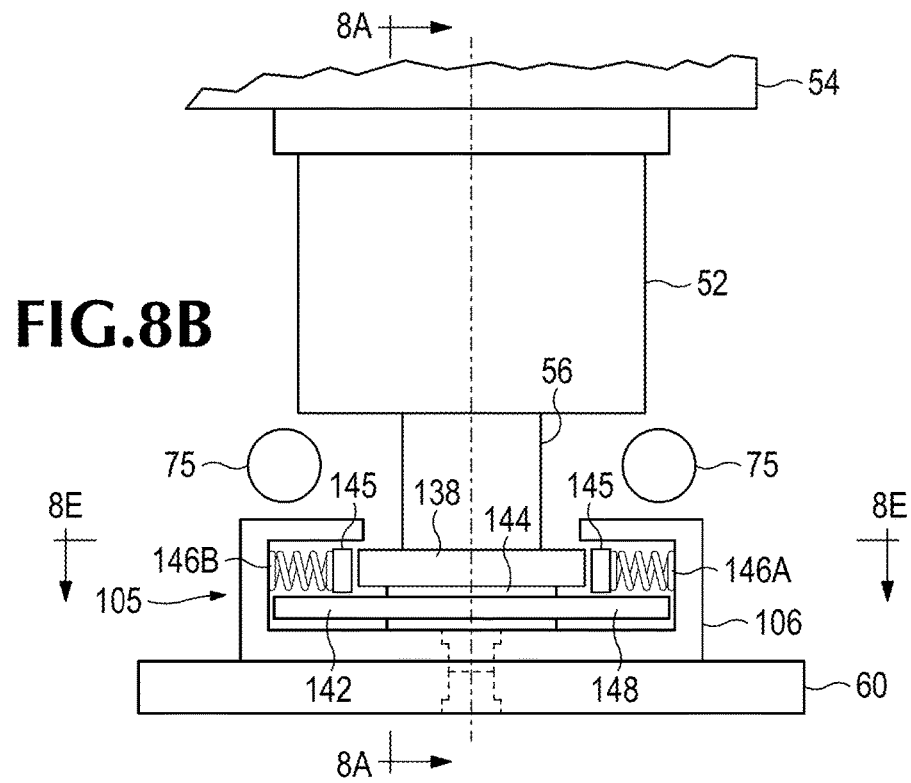
Figure 8C:
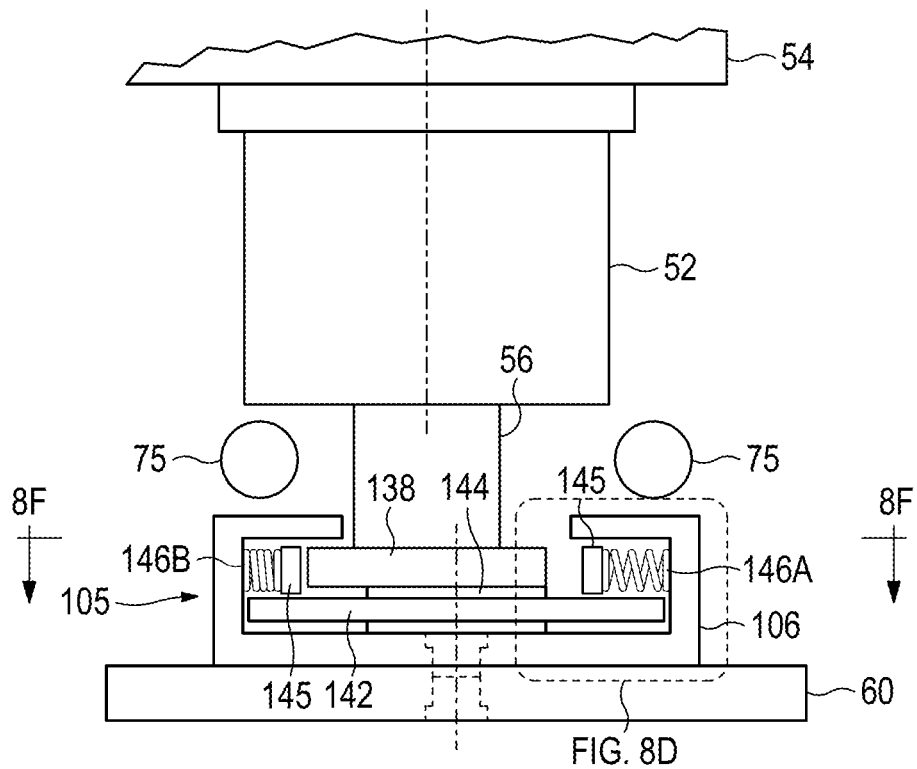
Figure 8D:
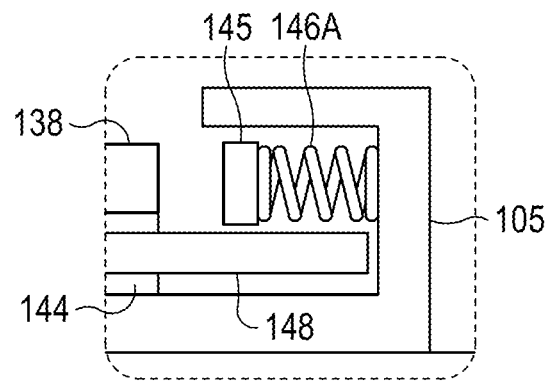
Figure 8E:
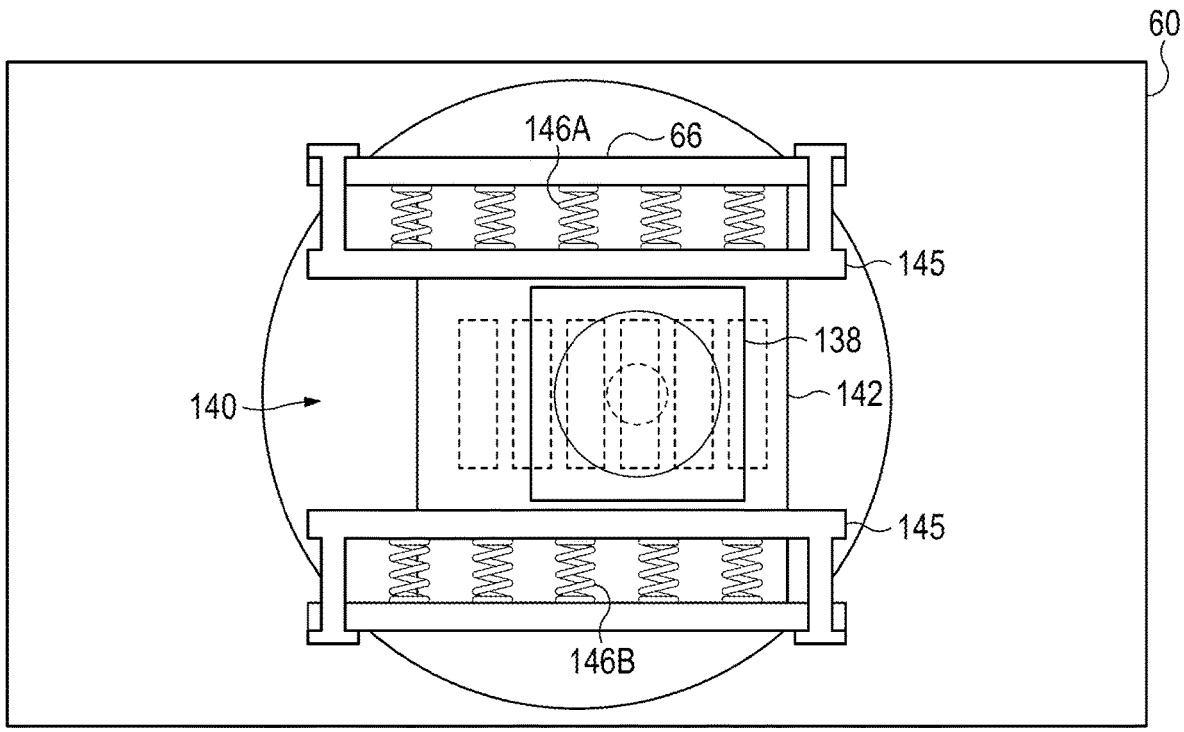

During some step operations, steering assembly 98 may again move load bearing frame 54 straight forward. In these step operations, load plate 138 and roller device 142 may move straight forward in substantially co-linear longitudinal axis alignment with roller track 106 as shown in FIGS. 8B and 8E. Biasing members 146A and 146B may remain in a substantially uncompressed state with guide members 145 slightly spaced from load plate 138.

Figure 8F:
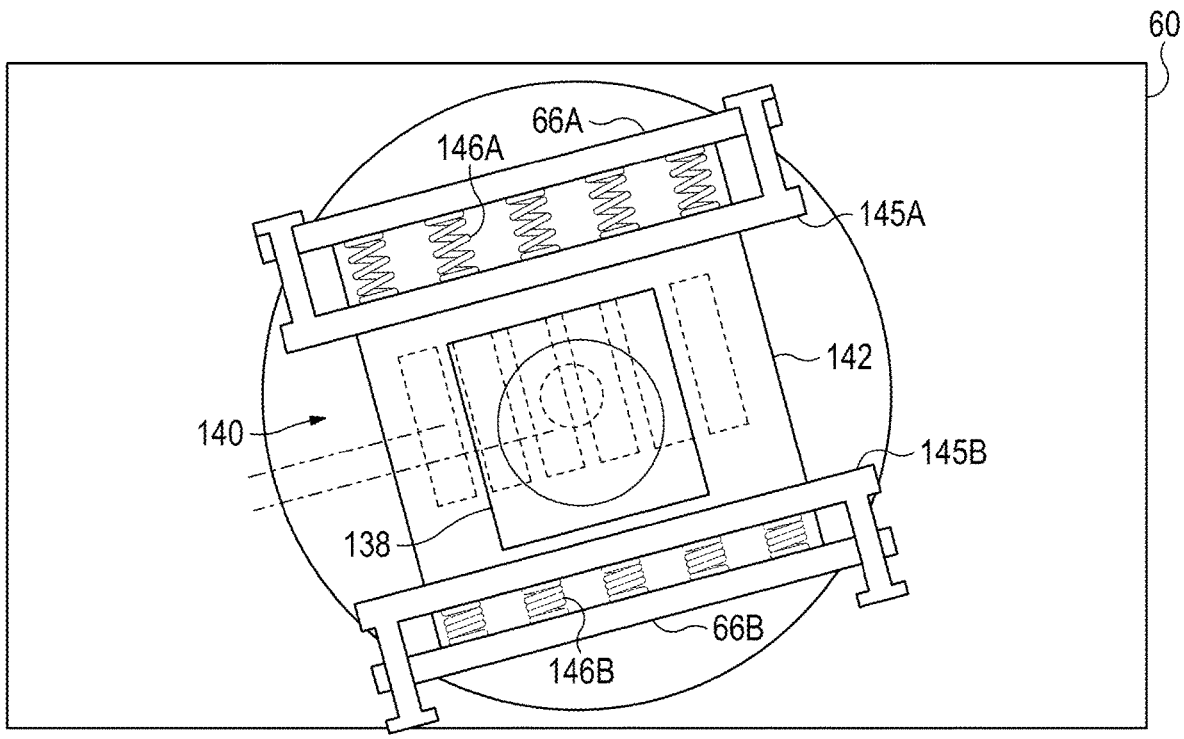

As also mentioned above, a differential rotation of one or more steering assemblies 98 may result in a yaw differential between one or more travel mechanisms 75. With a yaw differential between one or more travel mechanisms 75, a movement of the travel mechanisms 75 may result in a lateral displacement of one or more roller devices 132 or load plates 138 relative to a longitudinal axis of one or more roller tracks 106. The lateral displacement compresses one set of biasing members 146B as shown in FIGS. 8C and 8F while roller cage 148 and rollers 144 remain in substantially a same lateral aligned position with the longitudinal axis of roller track 106. Thus, load plate 138 moves in a lateral direction relative to the longitudinal center axes of both roller 142 and support foot 60.

After the step operation, load bearing frame 54 is lowered and support foot 60 is raised up off of the ground surface. Biasing member 146B elastically releases moving support foot 60 and roller track 106 back into lateral alignment with load plate 138 and roller device 142.

Steering assembly 98 in FIG. 8 may be rotationally attached to support foot 60 by a rotation device 82 similar to that shown above. Rotation device 82 again couples track assembly 105 to support foot 60. In another example, track assembly 105 in FIG. 8 is rigidly attached or formed into support foot 60. It should also be understood that leaf springs 86 in FIGS. 6 and 7, coil springs 146 in FIG. 8, or any other type of elastically flexible device can be used with any of the roller assemblies described above or below.

FIG. 9 shows another example roller assembly 150 similar to roller assembly 140 in FIG. 8 but with two parallel rows of rollers 154. FIG. 9A shows a front sectional view of roller assembly 150 in an aligned state and FIG. 9B shows a front sectional view of roller assembly 150 in a laterally displaced state. FIG. 9C shows an expanded partial view of a guide member 145 and biasing member 146 used in conjunction with roller assembly 150.

A roller device 152 includes a roller cage 156 that again extends substantially across the entire width of roller tack 106 underneath guide members 145 and biasing members 146. Roller cage 156 includes slots for holding two parallel rows of rollers 154. In this example, rollers 154 maintain lateral alignment relative to roller track 106 when a differential rotation of one or more steering assemblies 98 create a yaw differential between one or more travel mechanisms 75 and laterally displace load plate 138.

Figure 10A:
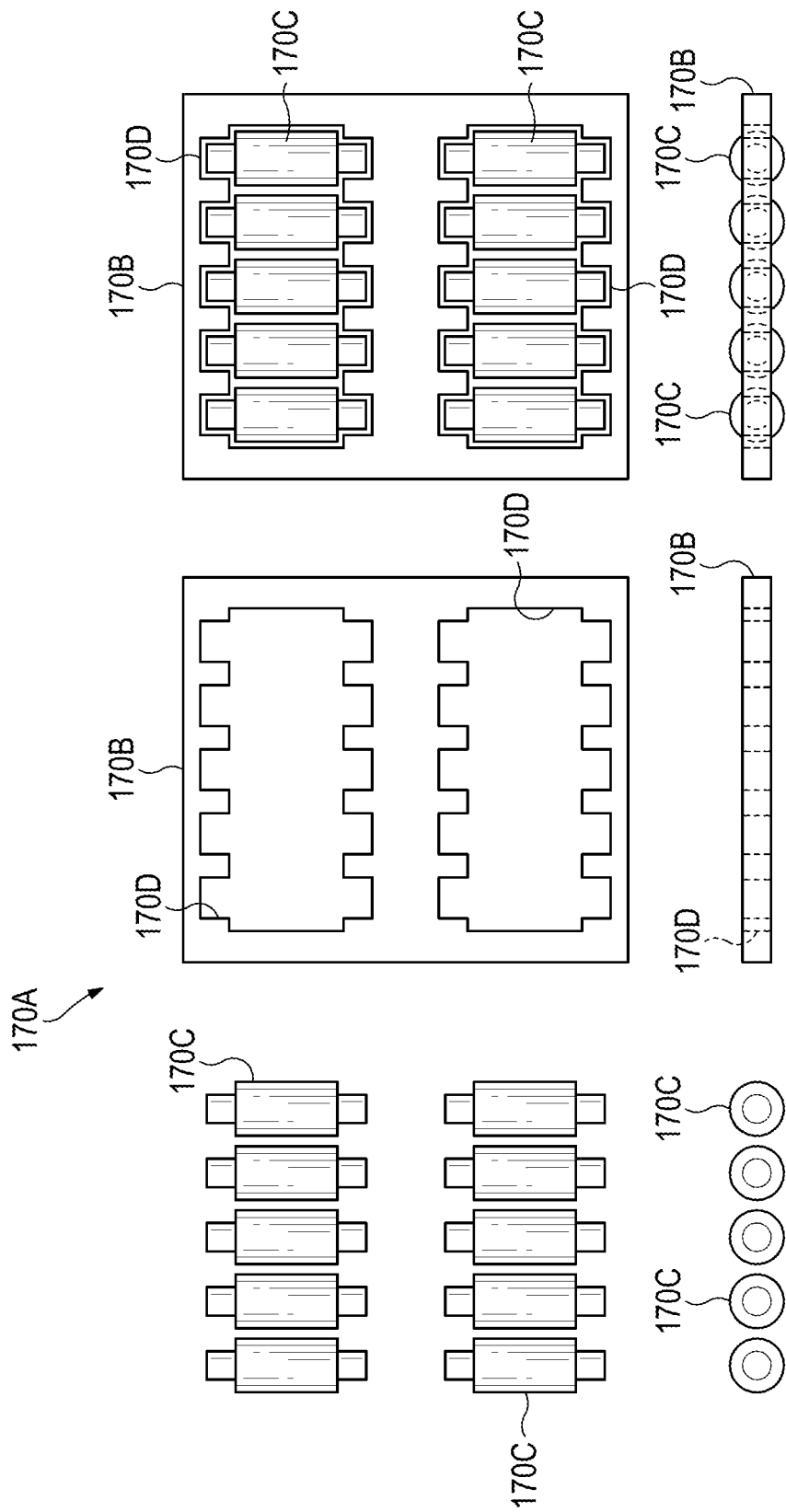
FIGS. 10A-10F show different example roller devices.

FIGS. 10A-10F show some example roller devices that may be used in any of the roller assemblies described above. Referring to FIG. 10A, the top row of three drawings show top plan views of a roller device 170A and the bottom row of three drawings show side sectional views of roller device 170A. The left most top and bottom drawings show isolated views of rollers 170C and the middle top and bottom drawings show isolated views of a roller cage 170B. The right most top and bottom drawings show assembled roller device 170A with rollers 170C inserted into slots 170D formed in roller cage 170B.

In this example, roller cage 170B includes two parallel slots 170D retaining parallel rows of laterally elongated stepped rollers 170C. Rollers 170C may include stepped narrower lateral ends that insert into corresponding narrower lateral ends formed in slots 170D. Rollers 170C may rotationally attach at opposite lateral ends to roller cage 170D using any conventional type of connector, such as pins, axles, bearings, etc. As shown in the bottom row of drawings, roller device 170A includes a substantially flat linear profile with a horizontal layer of rollers 170C.

Figure 10B:
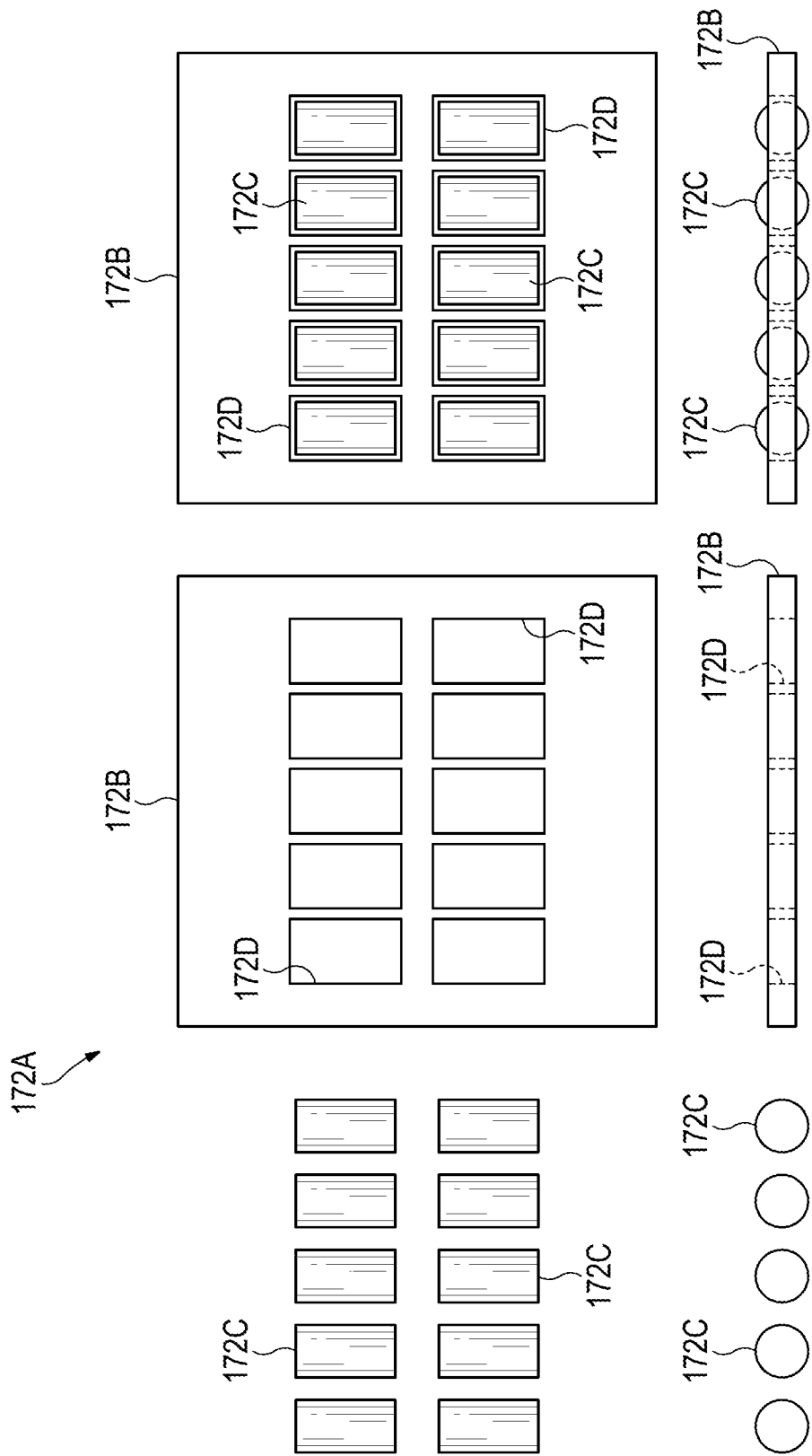

FIG. 10B includes a top row of three drawings showing top plan views of a roller device 172A and a bottom row of three drawings showing side sectional views of roller device 172A. The left most top and bottom drawings show isolated views of rollers 172C and the middle top and bottom drawings show isolated views of a roller cage 172B. The right most top and bottom drawings show assembled roller device 172A with rollers 172C inserted into slots 172D formed in roller cage 170B.

Roller cage 170B includes two parallel rows of slots 172D retaining two parallel rows of laterally elongated rollers 172C. In this example, rollers 170C are substantially cylindrical and rotationally attached at opposite lateral ends to roller cage 170D using any conventional type of connector, such as pins, axels, bearings, etc. As can be seen from the bottom row of drawings, roller device 172A also has a substantially flat linear profile with a single horizontal layer of rollers 172C.

Figure 10C:
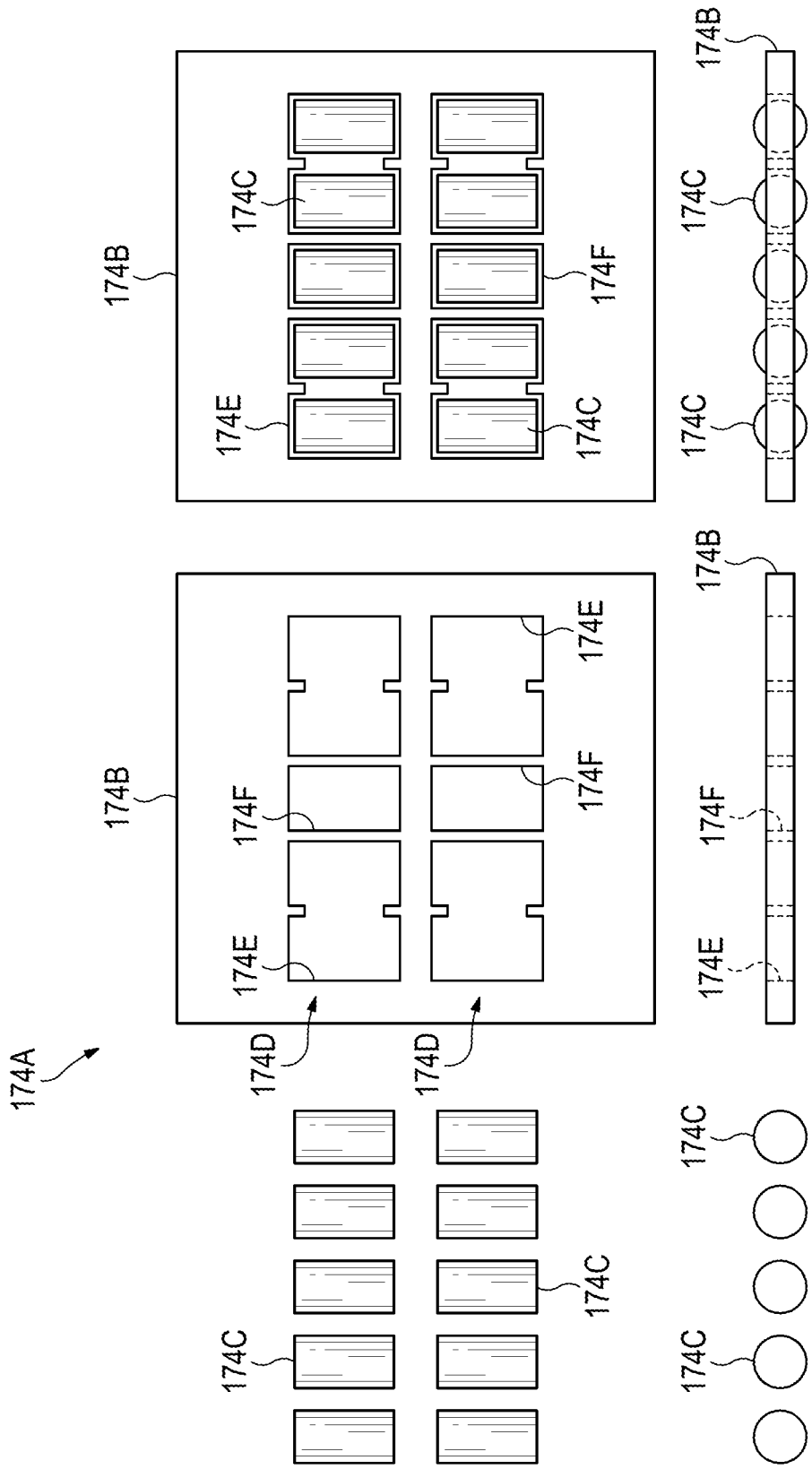

FIG. 10C includes a top row of three drawings showing top plan views of a roller device 174A and a bottom row of three drawings showing side sectional views of roller device 174A. The left most top and bottom drawings show isolated views of rollers 174C and the middle top and bottom drawings show isolated views of a roller cage 174B. The right most top and bottom drawings show fully assembled roller device 174A with rollers 174C inserted into slots 174D formed in roller cage 174B.

Roller cage 174B includes two parallel rows of slots 174D retaining parallel rows of laterally elongated cylindrical rollers 174C. In this example, slots 174D may include forward and back dual H-shaped slots 174E that are bridged together in the middle for retaining two rollers 174C. Rectangular center slots 174F are located between dual slots 174E and each retain a single roller 174C.

Figure 10D:
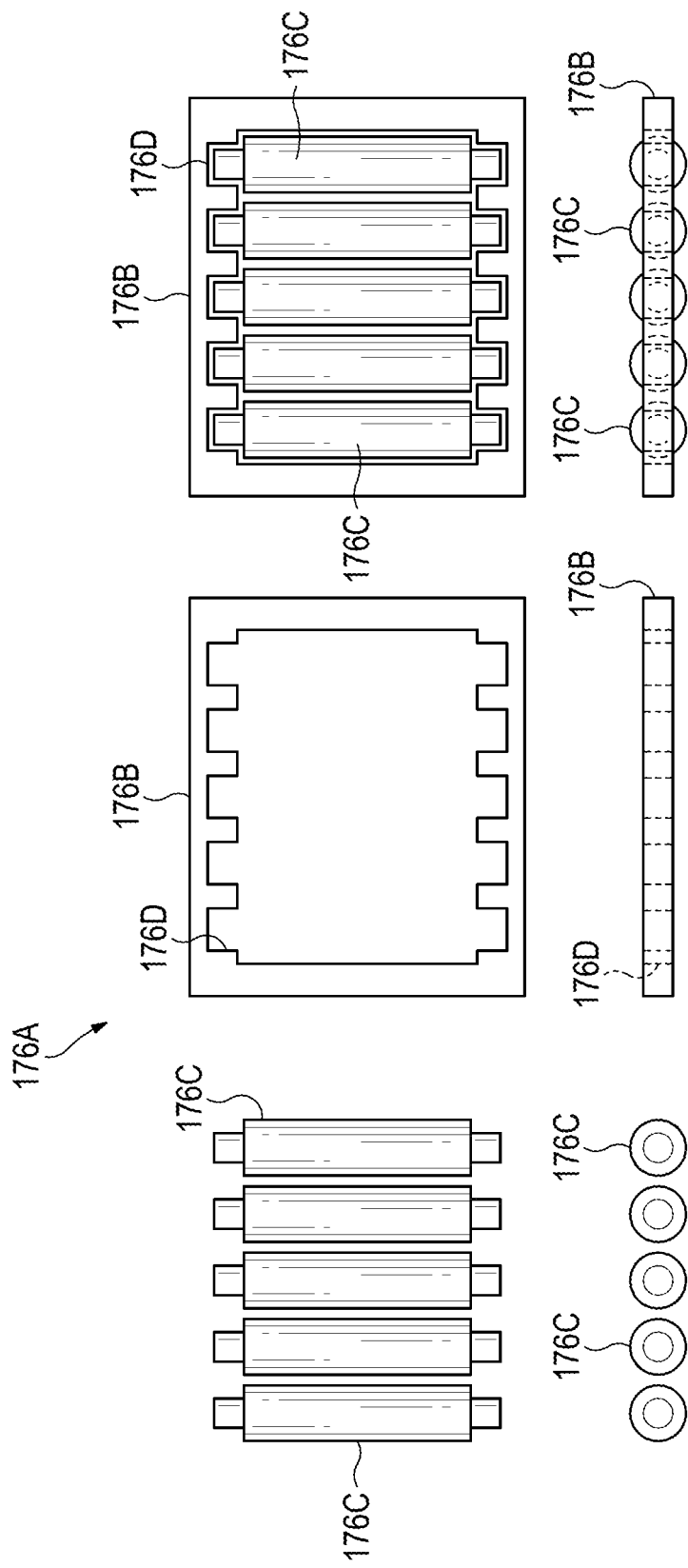

FIG. 10D includes a top row of three drawings showing top plan views of a roller device 176A and a bottom row of three drawings showing side sectional views of roller device 176A. The left most top and bottom drawings show isolated views of rollers 176C and the middle top and bottom drawings show isolated views of a roller cage 176B. The right most top and bottom drawings show fully assembled roller device 176A with rollers 176C inserted into slot 176D formed in roller cage 176B.

Roller cage 176B includes one continuous slot 176D retaining a single row of laterally elongated stepped rollers 176C. In this example, slot 176D includes stepped smaller diameter lateral sides for retaining stepped smaller diameter lateral ends of rollers 176C.

Figure 10E:
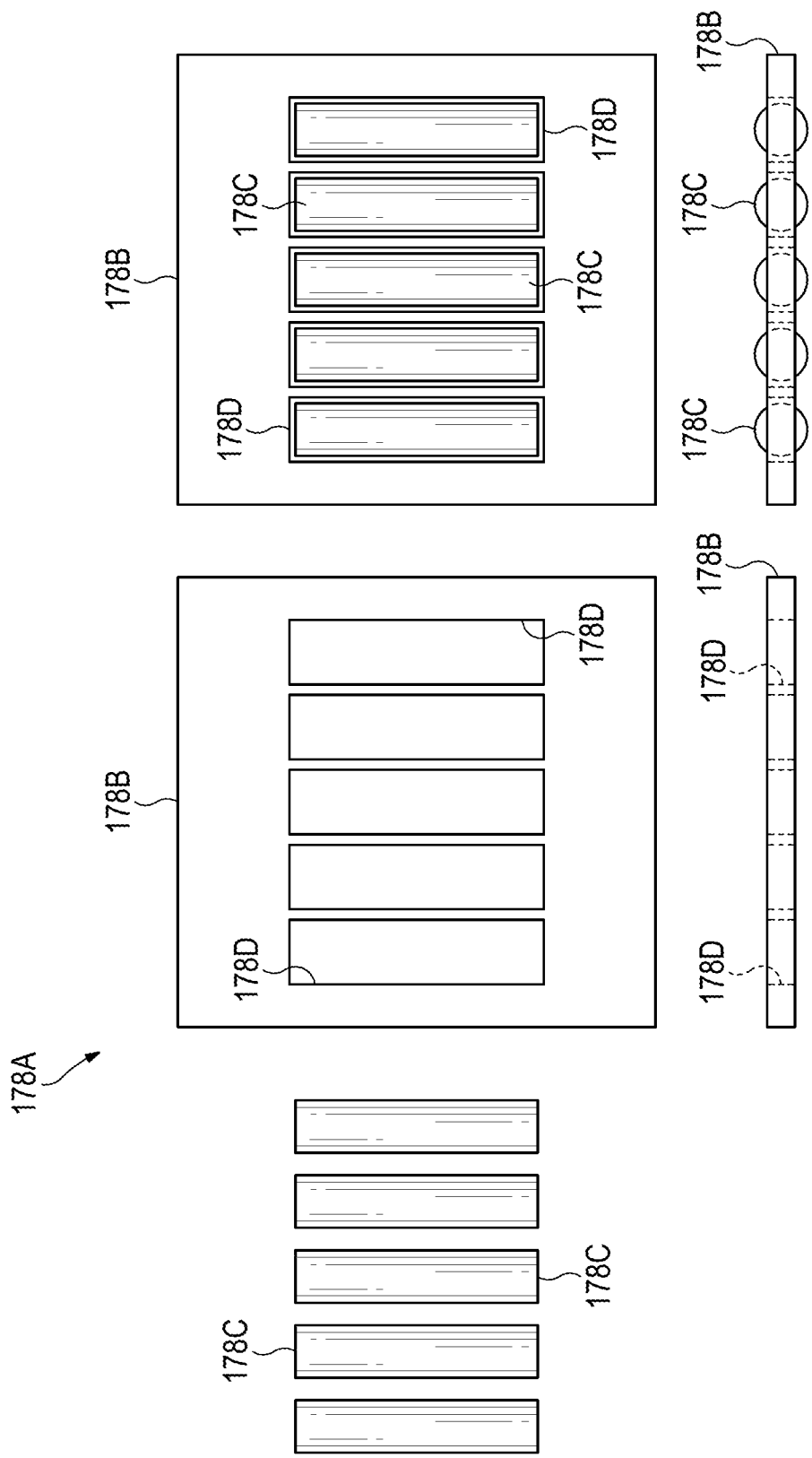

FIG. 10E includes a top row of three drawings showing top plan views of a roller device 178A and a bottom row of two drawings showing side sectional views of roller device 178A. The left most drawing shows an isolated view of rollers 178C and the middle top and bottom drawings show isolated views of a roller cage 178B. The right most top and bottom drawings show fully assembly roller device 178A with rollers 178C inserted into slots 178D formed in roller cage 178B. Roller cage 178B includes a single row of slots 178B retaining a single row of laterally elongated cylindrical rollers 178C.

Figure 10F:
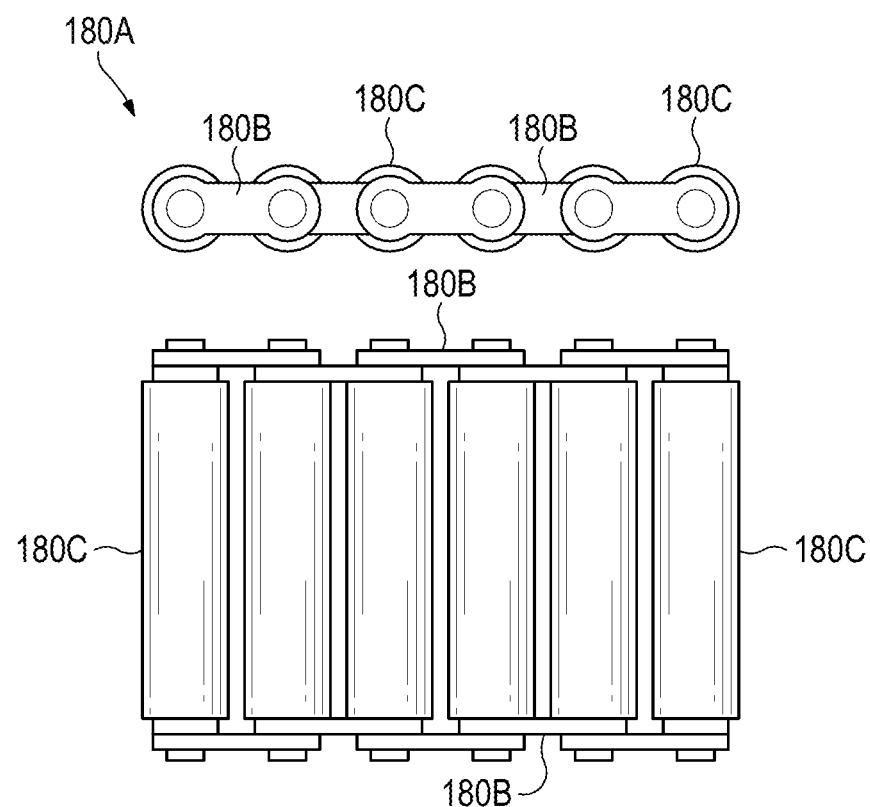

FIG. 10F shows another example roller device 180A that may be used with any of the low profile roller assemblies described above. A top drawing shows a side view of roller device 180A and a bottom drawing shows a top plan view of roller device 180A. Instead of using a roller cage, roller device 180A may include chains 180B that rotationally attach to opposite lateral sides of cylindrical rollers 180C.

All of the roller devices 170-180 shown in FIGS. 10A-10F include flat linear profiles that help reduce the overall mounting height of the walking machine. The single layer of one or more rows of cylinders are used in combination with a substantially flat load plate that reciprocates over a top surface of the roller device to further reduce the overall mounting height of the walking machine.

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

The invention claimed is:

1. A load transporting apparatus configured to move a load over a base surface, comprising:
    a lift mechanism structured to lift a load-bearing frame supporting the load;
    a load plate coupled to the lift mechanism;
    a support foot configured to contact the base surface;
    a roller track coupled to the support foot;
    a travel mechanism coupled between the load plate and the roller track, the travel mechanism configured to displace the load bearing frame relative to the support foot;
    a reciprocating roller assembly located between the load plate and the roller track, the reciprocating roller assembly including a roller cage and rollers configured to contact the load plate and the roller track during a loaded state and roll in response to a linear displacement of the load plate relative to the roller track; and
    at least one set of stops extending from the load plate, the roller cage, or the roller track, the at least one of the stops configured to reposition the reciprocating roller assembly during an unloaded state and limit travel of the reciprocating roller assembly during the loaded state.

2. The apparatus of claim 1, wherein the rollers comprise a single layer of rollers, and wherein the roller cage comprises a substantially flat roller cage with slots configured to hold the single layer of rollers.

3. The apparatus of claim 1, wherein the rollers are rotatably attached together on opposite lateral ends with chains.

4. The apparatus of claim 1 wherein the load plate and the reciprocating roller assembly are laterally displaceable relative to the longitudinal axis of the roller track.

5. The apparatus of claim 1, wherein one of the stops comprises an arm that extends downward from a front end of the load plate, wherein the arm is configured to move from a position extending out in front of front end of the reciprocating roller assembly to an abutting position abutting up against the front end of the reciprocating roller assembly, the arm while in the abutting position configured to push the reciprocating roller assembly toward a back end of the support foot while the support foot is raised and the travel mechanism moves from a retracted position to an extended position.

6. The apparatus of claim 1, wherein one of the stops comprises an arm that extends upward from a back end of the roller track, wherein the arm is configured to move from a position extending out from a back end of the load plate to an abutting position abutting up against the back end of the load plate, the arm while in the abutting position configured to pull the reciprocating roller assembly toward a back end of the support foot while the support foot is raised and the travel mechanism moves from a retracted position to an extended position.

7. The apparatus of claim 1, including a track assembly coupled to the support foot to hold the reciprocating roller assembly, the track assembly including side walls that extend up along sides of the reciprocating roller assembly and the load plate.

8. The apparatus of claim 7, further comprising a rotation device rotationally coupling the roller track assembly to the support foot, wherein the roller track assembly is configured to steer the reciprocating roller assembly, travel mechanism, and load plate about a vertical axis relative to the support foot.

9. A load transporting apparatus configured to move a load over a base surface, comprising:
   a lift mechanism structured to lift a load-bearing frame supporting the load;
   a load plate coupled to the lift mechanism;
   a support foot configured to contact the base surface;
   a roller track coupled to the support foot;
   a travel mechanism coupled between the load plate and the roller track, the travel mechanism configured to displace the load bearing frame relative to the support foot; and
   a reciprocating roller assembly located between the load plate and the roller track, the reciprocating roller assembly comprising a plurality of linear rollers configured to contact the load plate and the roller track during a loaded state and roll in response to a linear displacement of the load plate relative to the roller track, wherein the load plate is laterally displaceable relative to longitudinal axes of the roller track and the linear rollers.

10. A load transporting apparatus configured to move a load over a base surface, comprising:
    a lift mechanism structured to lift a load-bearing frame supporting the load;
    a load plate coupled to the lift mechanism;
    a support foot configured to contact the base surface;
    a roller track coupled to the support foot;
    a travel mechanism coupled between the load plate and the roller track, the travel mechanism configured to displace the load bearing frame relative to the support foot; and
    a reciprocating roller assembly located between the load plate and the roller track, the reciprocating roller assembly comprising a plurality of linear rollers configured to contact the load plate and the roller track during a loaded state and roll in response to a linear displacement of the load plate relative to the roller track, wherein the reciprocating roller assembly is configured to move from underneath a first longitudinal end of the load plate to underneath a second opposite longitudinal end of the load plate after the lift mechanism lowers the support foot onto the base surface and raises the load-bearing frame, and the travel mechanism moves from an extended position to a retracted position.

11. A load transporting apparatus configured to move a load over a base surface, comprising:
    a lift mechanism structured to lift a load-bearing frame supporting the load;
    a load plate coupled to the lift mechanism;
    a support foot configured to contact the base surface;
    a roller track coupled to the support foot;
    a travel mechanism coupled between the load plate and the roller track, the travel mechanism configured to displace the load bearing frame relative to the support foot;
    a reciprocating roller assembly located between the load plate and the roller track, the reciprocating roller assembly comprising a plurality of linear rollers configured to contact the load plate and the roller track during a loaded state and roll in response to a linear displacement of the load plate relative to the roller track;
    a roller track assembly attached to the support foot;
    guide members attached to side walls of the roller track assembly; and
    biasing members located between the side walls and the guide members.

12. The apparatus of claim 11, wherein the reciprocating roller assembly includes:
    a roller cage that extends between the side walls of the roller track assembly and underneath the load plate, biasing members and guide members; and
    a set of linear rollers located underneath the load plate inside of one or more slots formed in the roller cage.

13. The apparatus of claim 12, wherein a lateral displacement of the load relative to the roller track laterally displaces the reciprocating roller assembly and load plate relative to a longitudinal axis of the roller track and compresses one set of the biasing members.

14. The apparatus of claim 11, wherein the reciprocating roller assembly includes:
    a roller cage that extends between the guide members; and
    a set of linear rollers located underneath the load plate inside of one or more slots formed in the roller cage.

15. A load transporting apparatus configured to move a load over a ground surface, comprising:
    a lift mechanism configured to lift the load;
    a load plate attached to the lift mechanism;
    a support foot connected to the lift mechanism, the lift mechanism configured to raise the support foot off the ground surface and lower the support foot onto the ground surface;
    a roller track located on the support foot;
    a travel mechanism connected between the lift mechanism and the support foot and configured to move the load relative to the support foot; and
    a reciprocating roller assembly located between the load plate and the roller track, the reciprocating roller assembly including a substantially linear roller cage with one or more slots and a set of rollers located in the slots.

16. The apparatus of claim 15, wherein the roller cage is laterally displaceable relative to a longitudinal axis of the rollers.

17. The apparatus of claim 15, wherein the travel mechanism is configured to longitudinally displace the load plate relative to the support foot and the roller track.

18. The apparatus of claim 15 wherein the load plate is laterally displaceable relative to a longitudinal axis of the rollers.

19. The apparatus of claim 15 wherein the travel mechanism is configured to laterally displace the load plate relative to longitudinal axes of the reciprocating roller assembly and the roller track.

20. The apparatus of claim 15, wherein the roller cage includes an arm extending up from a longitudinal end, the arm configured to abut up against a back end of the load plate and pull the reciprocating roller assembly toward a back end of the support foot while the support foot is raised and the travel mechanism moves from a retracted to an extended position.

21. The apparatus of claim 15, wherein the load plate includes an arm extending down from a longitudinal end, the arm configured to abut up against a front end of the reciprocating roller assembly and push the reciprocating roller assembly toward a back end of the support foot while the support foot is raised and the travel mechanism moves from a retracted to an extended position.

22. The apparatus of claim 15, including a rotation device coupled between the roller track and the support foot enabling the load plate, roller track, and reciprocating roller assembly to rotate about a vertical axis relative to the support foot.

23. An apparatus configured to move a load over a ground surface, comprising:
- a lift mechanism configured to lift the load;
- a load plate attached to the lift mechanism;
- a support foot connected to the lift mechanism, the lift mechanism configured to raise the support foot off the ground surface and lower the support foot onto the ground surface;
- a roller track located on the support foot;
- a travel mechanism configured to move the load relative to the support foot; and
- a reciprocating roller assembly located between the load plate and the roller track, the reciprocating roller assembly comprising a substantially linear roller cage with one or more slots and a plurality of linear rollers located in the slots, the linear rollers configured to transfer the load from the load plate in contact with a first side of the rollers to the roller track in contact with a second opposite side of the rollers.

24. The apparatus of claim 23, wherein the travel mechanism is configured to longitudinally displace the load plate relative to the reciprocating roller assembly.

25. The apparatus of claim 23, wherein the travel mechanism is configured to laterally displace the load plate relative to the reciprocating roller assembly.

* * * * *